(12) United States Patent
Ramachandra et al.

(10) Patent No.: US 10,784,941 B2
(45) Date of Patent: Sep. 22, 2020

(54) MINIMIZING NETWORK PLANNING USING REFERENCE SIGNAL GROUPING

(71) Applicant: Telefonaktiebolaget LM Ericsson (publ), Stockholm (SE)

(72) Inventors: Pradeepa Ramachandra, Linköping (SE); Icaro L. J. Da Silva, Solna (SE); Reza Moosavi, Linköping (SE); Edgar Ramos, Kirkkonummi (FI); Claes Tidestav, Bålsta (SE); Umut Ugurlu, Cambridge (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 15/738,662

(22) PCT Filed: Sep. 29, 2017

(86) PCT No.: PCT/SE2017/050955
§ 371 (c)(1),
(2) Date: Dec. 21, 2017

(87) PCT Pub. No.: WO2018/063079
PCT Pub. Date: Apr. 5, 2018

(65) Prior Publication Data
US 2020/0136707 A1    Apr. 30, 2020

Related U.S. Application Data

(60) Provisional application No. 62/402,908, filed on Sep. 30, 2016.

(30) Foreign Application Priority Data

Oct. 30, 2016 (EP) .................... 123 ABC

(51) Int. Cl.
*H04B 7/06* (2006.01)
*H04L 1/00* (2006.01)
(Continued)

(52) U.S. Cl.
CPC ......... *H04B 7/0695* (2013.01); *H04L 1/0026* (2013.01); *H04L 5/0051* (2013.01);
(Continued)

(58) Field of Classification Search
CPC ....... H04W 76/11; H04W 8/08; H04W 16/28; H04W 72/046; H04W 72/0466; H04L 1/0026; H04L 5/0051; H04B 7/0695
See application file for complete search history.

(56) References Cited

U.S. PATENT DOCUMENTS 9,113,379 B2 *  8/2015  Jung .................. H04W 36/0061
2012/0313961 A1 * 12/2012  Laine ...................... G06T 15/00
                                                        345/592

(Continued)

OTHER PUBLICATIONS

PCT International Search Report for International application No. PCT/SE2017/050955—dated Jan. 3, 2018.
(Continued)

*Primary Examiner* — Brian D Nguyen
(74) *Attorney, Agent, or Firm* — Baker Botts, LLP

(57) ABSTRACT

According to some embodiments, a method for use in a network node of transmitting reference signals in a wireless network using a plurality of beams comprises obtaining a node identifier for the network node. The node identifier is unique for neighboring network nodes within a particular coverage area of the wireless network. The method further comprises obtaining a group of reference signal sequences. The group comprises a subset of a pool of possible reference signal sequences for use in the wireless network. Each reference signal sequence is associated with a beam reference identifier. The method further comprises selecting a
(Continued)

reference signal sequence from the obtained group: scrambling a reference signal transmission pattern using the obtained node identifier and the selected reference signal sequence with associated beam reference identifier; and transmitting the scrambled reference signal transmission pattern to a user equipment on one of the beams among the plurality of beams.

23 Claims, 19 Drawing Sheets

(51) Int. Cl.
*H04L 5/00* (2006.01)
*H04W 16/28* (2009.01)
*H04W 72/04* (2009.01)
*H04W 76/11* (2018.01)
*H04W 8/08* (2009.01)

(52) U.S. Cl.
CPC ............ *H04W 8/08* (2013.01); *H04W 16/28* (2013.01); *H04W 72/046* (2013.01); *H04W 72/0466* (2013.01); *H04W 76/11* (2018.02)

(56) References Cited

U.S. PATENT DOCUMENTS

| | | | |
|---|---|---|---|
| 2014/0086093 A1* | 3/2014 | Liu | H04W 24/02 370/252 |
| 2014/0120928 A1* | 5/2014 | Dimou | H04W 16/08 455/452.1 |
| 2014/0314011 A1* | 10/2014 | Guan | H04L 5/0048 370/329 |
| 2015/0341883 A1* | 11/2015 | Han | H04W 56/0015 370/350 |
| 2016/0197659 A1* | 7/2016 | Yu | H04W 16/28 370/335 |
| 2016/0270082 A1* | 9/2016 | Soriaga | H04W 72/0486 |
| 2018/0192397 A1* | 7/2018 | Seo | H04W 72/02 |
| 2018/0287753 A1* | 10/2018 | Sun | H04L 5/0048 |
| 2018/0316469 A1* | 11/2018 | Jiang | H04L 5/0051 |
| 2019/0132029 A1* | 5/2019 | Sun | H04J 11/00 |
| 2019/0182629 A1* | 6/2019 | Priyanto | G01S 5/10 |

OTHER PUBLICATIONS

PCT Written Opinion of the International Searching Authority for International application No. PCT/SE2017/050955—dated Jan. 3, 2018.

TSG-RAN WG1 #49; Kobe, Japan; Source: Ericsson; Title: Uplink reference-signal (DM) structure (R1-072467)—May 7-11, 2007.

3GPP TSG RAN WG1 Meeting #86; Gothenburg, Sweden; Source: NTT Docomo, Inc.; Title: Discussion on initial access and mobility for NR (R1-167912)—Aug. 22-26, 2016.

3GPP TSG RAN Meeting #71; Goteborg, Sweden; Source: NTT Docomo; Title: New SID Proposal: Study on New Radio Access Technology (RP-160671)—Mar. 7-10, 2016.

* cited by examiner

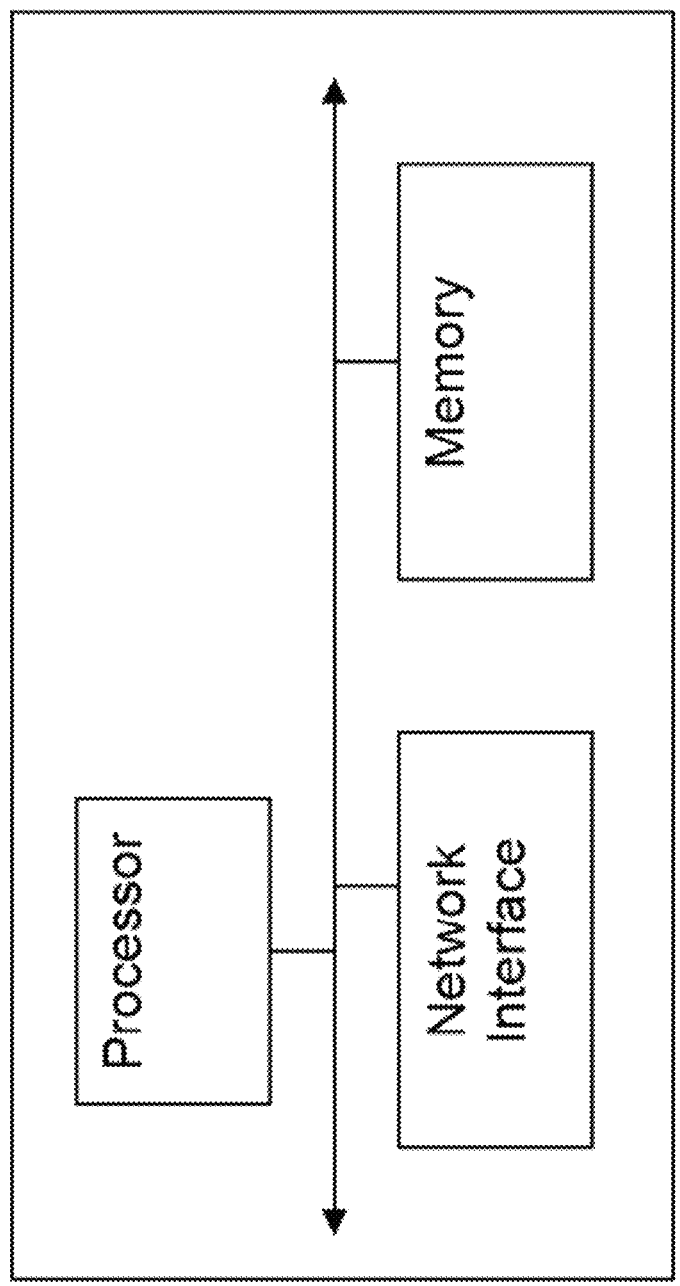

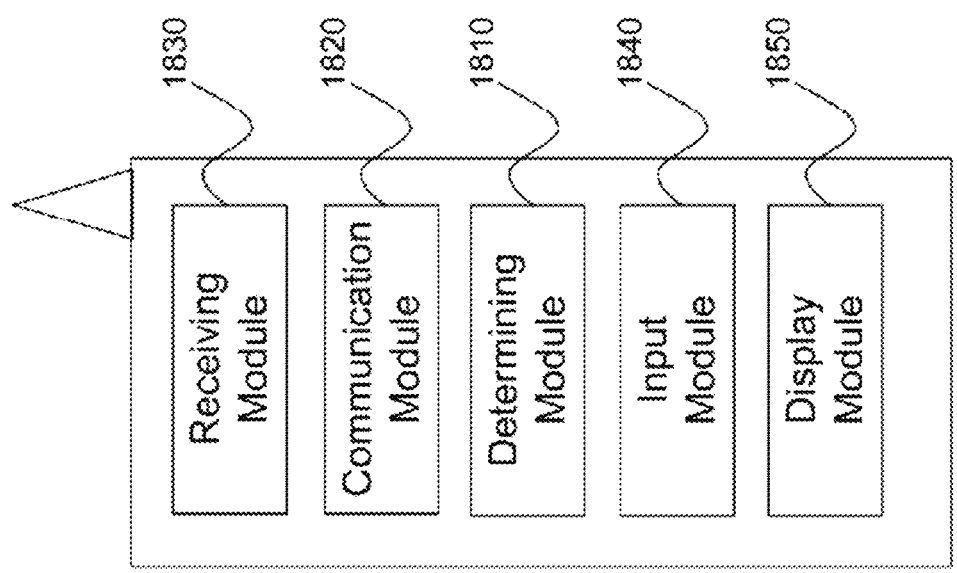

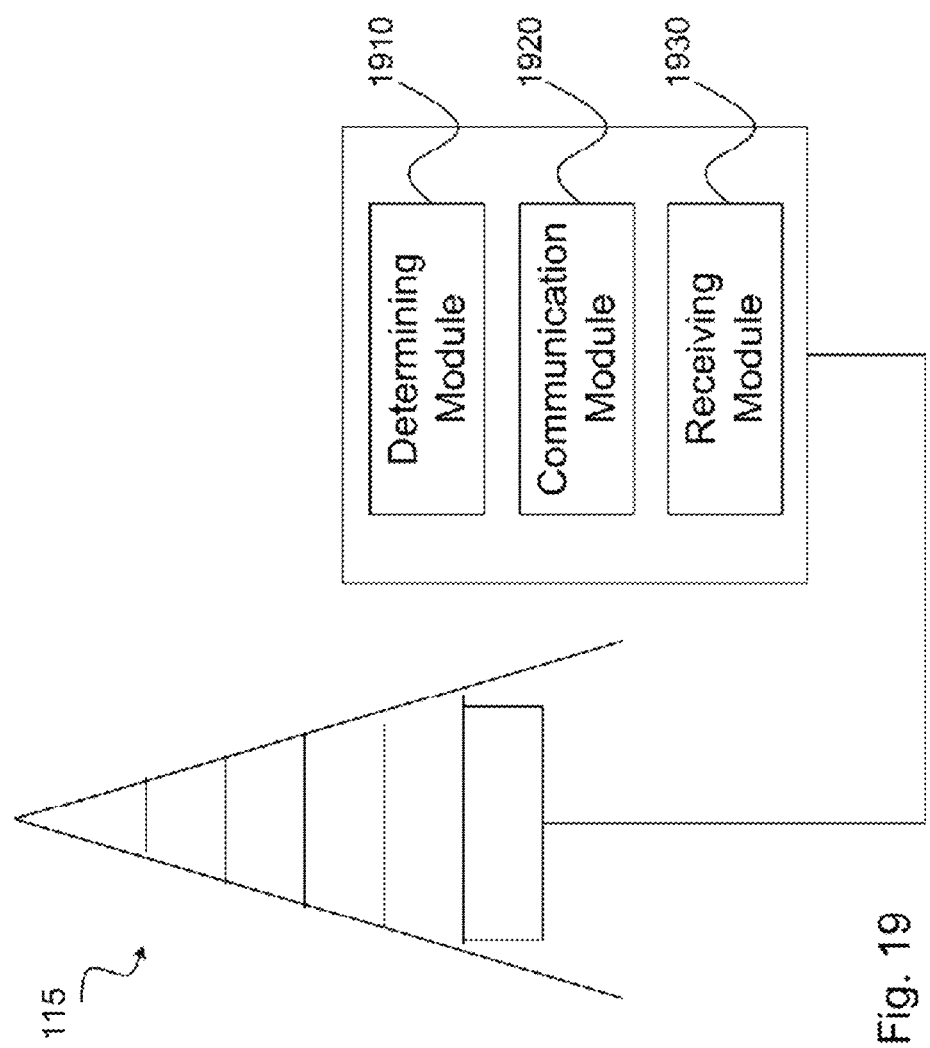

MINIMIZING NETWORK PLANNING USING REFERENCE SIGNAL GROUPING

PRIORITY

This nonprovisional application is a U.S. National Stage Filing under 35 U.S.C. § 371 of International Patent Application Serial No. PCT/SE2017/050955 filed Sep. 29, 2017, and entitled "*Minimizing Network Planning Using Reference Signal Grouping*" which claims priority to U.S. Provisional Patent Application No. 62/402,908 filed Sep. 30, 2016, both of which are hereby incorporated by reference in their entirety.

TECHNICAL FIELD

The present disclosure relates, in general, to wireless communications and, more particularly, to methods to minimize network planning using mobility reference signal grouping.

INTRODUCTION

The present disclosure relates to synchronization procedures in Long Term Evolution (LTE) Physical Cell Identity (PCI) planning to avoid PCI collisions, and a level of orthogonality among Cell-Specific Reference Symbols (CRSs) transmitted by neighbor cells.

In LTE, a user equipment (UE) obtains both time/frequency synchronizations in the downlink (DL) with a cell using a Primary Synchronization Signal (PSS) and a Secondary Synchronization Signal (SSS). The UE uses the PSS/SSS to obtain frequency and time (i.e., symbol and frame) synchronization.

Three synchronization requirements in the LTE system include: (a) symbol and frame timing acquisition, by which the correct symbol start position is determined (e.g., to set the Discrete Fourier Transform (DFT) window position); (b) frequency synchronization, which is required to reduce or eliminate the effect of frequency errors arising from a mismatch of the local oscillators between the transmit/receive (Tx/Rx), as well as the Doppler shift caused by UE motion; and (c) phase synchronization.

These sequences (i.e., the PSS and SSS) also encode the Cyclic Prefix (CP) length, the PCI and whether the cell uses Frequency Domain Duplex (FDD) or Time Domain Duplex (TDD). Due to these properties, the sequences that together combine the PCI provide the UE a clear synchronization reference in the DL for both "RRC Idle" and "RRC Connected" procedures. For example, in "RRC Idle" the synchronization enables the UE to camp on an LTE cell and possibly access the cell by sending a preamble to the Physical Random Access Channel (PRACH) whose configuration has been provided via system information, also associated to that cell.

FIG. 1 illustrates an example of PSS and SSS frame and slot structure in time domain in the FDD case. In the FDD case, the synchronization signals are transmitted periodically, twice per 10 ms radio frame, which enables the UEs to always be able to synchronize with any radio frame. In an FDD cell, the PSS is always located in the last Orthogonal Frequency Division Multiplexing (OFDM) symbol of the first and 11th time slots of each radio frame, thus enabling the UE to acquire the slot boundary timing independently of the CP length. The SSS is located in the symbol immediately preceding the PSS, a design choice enabling coherent detection of the SSS relative to the PSS, based on the assumption that the channel coherence duration is significantly longer than one OFDM symbol.

FIG. 2 illustrates an example of PSS and SSS frame and slot structure in the TDD case. In the TDD case, the synchronization signals are transmitted periodically, twice per 10 ms radio frame which (like the FDD case) enables the UEs to always be able to synchronize with any radio frame. In a TDD cell, the PSS is located in the third symbol of the 3rd and 13th slots, while the SSS is located three symbols earlier. Coherent detection can be used under the assumption that the channel coherence time is significantly longer than four OFDM symbols. The precise position of the SSS changes depends on the length of the CP configured for the cell. At this stage of the cell detection process, the CP length is unknown a priori to the UE, and it is, therefore, blindly detected by checking for the SSS at the two possible positions. While the PSS in a given cell is the same in every subframe in which it is transmitted, the two SSS transmissions in each radio frame change in a specific manner, thus enabling the UE to establish the position of the 10 ms radio frame boundary.

FIG. 3 illustrates an example of PSS and SSS frame structure in frequency and time domain for an FDD cell. More particularly, FIG. 3 illustrates the mapping of the PSS and SSS to subcarriers in the frequency domain. The PSS and SSS are transmitted in the central six Resource Blocks (RBs), enabling the frequency mapping of the synchronization signals to be invariant with respect to the system bandwidth (which can, in principle, vary from 6 to 100 usable RBs to suit channel bandwidths between around 1.4 MHz and 20 MHz). This enables the UE to synchronize to the network without any a priori knowledge of the allocated bandwidth.

The particular sequences that are transmitted for the PSS and SSS in a given cell are used to indicate the physical layer cell identity to the UE. LTE includes 504 unique PCIs grouped into 168 groups of three identities. The three identities in a group may typically be assigned to cells under the control of the same network node (e.g., an eNodeB). Three PSS sequences are used to indicate the cell identity within the group, and 168 SSS sequences are used to indicate the identity of the group.

PCI collision and PCI confusion are two problems that may occur in LTE. PCI is calculated by using PSS and SSS in the following formula:

$$N_{ID}^{CELL}=3N_{ID}^{(1)}+N_{ID}^{(2)}$$

where the SSS-$N_{ID}^{(1)}$ indicates the physical cell identity group (0 to 167) and PSS-$N_{ID}^{(2)}$ indicates the cell identity within the group (0 to 2). This arrangement creates 504 (168×3=504) unique PCIs. When many cells exist in an LTE system, some cells must share one PCI. A PCI conflict between neighboring cells may occur if PCIs are planned inappropriately or changed manually, or if neighboring cell parameters are modified. Appropriate planning may avoid two potential problems: (1) PCI collision and (2) PCI confusion.

FIG. 4 illustrates an example of PCI collision. A PCI collision occurs between two intra-frequency cells that use an identical PCI. In this case, UEs in the overlapping area of the two cells cannot implement signal synchronization or decoding. In the example of FIG. 4, a PCI collision occurs between cell A and cell B.

FIG. 5 illustrates an example of PCI confusion. Lack of proper PCI planning may also cause PCI confusion between a detected cell and a neighboring cell if the two cells have the same frequency and PCI and if the reference signal received power (RSRP) of the two cells reaches the handover threshold. The PCI confusion may lead to UE handover failures or service drops.

In the example of FIG. 5, if the UE does not support Automatic Neighbor Relation (ANR), the eNodeB cannot determine whether the detected cell is cell B or C based on the report by the UE. This may lead to a handover failure. If the UE supports ANR, the eNodeB can identify cell B based on the E-UTRAN cell global identifier (ECGI) reported by the UE. Then, a handover to cell B can be performed if necessary.

Thus, PCI planning is important in LTE. The way a network operator plans PCIs, however, is not standardized. Available literature on planning includes many different methods. One possible strategy is to group neighboring sites into a cluster, and assign each cluster a limited number of Code Groups. Each site is assigned a specific Code Group and each sector a specific Color Group. Another possible strategy could simply be a random planning (i.e., a PCI plan that does not consider PCI grouping and does not follow any specific reuse pattern).

In the first strategy (i.e., grouping neighboring sites into a cluster and assigning each cluster a limited number of Code Groups), PCIs can be split into 3 different color groups and 168 code groups. Code groups may be reserved for special purposes, for example, in-building and Public Land Mobile Network (PLMN) borders or for future expansions. One can alternatively derive the PCIs are follows:

$PCI_i = 3SSS_j + PSS_k$.

Table 1 below illustrates the PCIs derived from PSSs/SSSs and their color code. In the example of Table 1, Color Group 0 is yellow, Color Group 1 is green, and Color Group 2 is orange.

TABLE 1

PCIs derived from PSSs/SSSs and their color code.

| Color | | 0 | 1 | 2 | ... | 162 | 163 | 164 | 165 | 166 | 167 |
|---|---|---|---|---|---|---|---|---|---|---|---|
| 0 | yellow | 0 | 3 | 6 | ... | 486 | 489 | 492 | 495 | 498 | 501 |
| 1 | green | 4 | 7 | 10 | | 490 | 493 | 496 | 499 | 502 | 1 |
| 2 | orange | 8 | 11 | 14 | ... | 494 | 497 | 500 | 503 | 2 | 5 |

Assigning a color group per sector and assigning a code group per site will likely eliminate the risk of having the same k or frequency shift in the same site, in adjacent cells, or pointing at each other.

FIG. 6 illustrates an example of a few clusters with their assigned PCI to avoid conflict and collisions. In the example of FIG. 6, an allocation with 10 to 15 sites is shown with 3-sector sites in a cluster. Each site includes 3 color groups (k). The group of sites in the same cluster are represented by the same pattern. For each cluster, a subset of code groups is used. For example, if approximately 70 code groups are available, PCIs may be repeated every fifth or sixth cluster. Structured planning like this eliminates the risk of having conflicting k or frequency shift in the same site, in adjacent cells, or pointing at each other. Also, the risk of having conflicting SSS sequences in adjacent cells is reduced, but may appear at cluster borders.

Despite the simplicity of the previously described methodology, in practice the coverage patterns are not regular in terms of inter-side distances and sector angles. For example, deployments in the same area may include 3-sector, 6-sector and Omni sites. Therefore, following a strict planning pattern may not be possible, and a network planner may need to follow priority orders.

One possible priority order when planning PCIs is the following: (a) the same PCIs should be avoided within the same site and as neighbors; (b) PCIs with conflicting k values should be avoided within the same site and as neighbors; and (c) PCIs with conflicting m0 and m1 values should be avoided within the same site and as neighbors, where m0 and m1 are parameters derived from the SSS. Exceptions for not following the rules strictly may include: (a) where the rules may not work in an irregular pattern; and (b) where the rules may cause burdensome limitations on neighbors so that neighbor lists have to be shortened.

A UE obtains time/frequency synchronization by detecting and measuring a mobility reference signal (MRS). The MRS can be constructed by concatenating a time and frequency synchronization signal (TSS) and a beam reference signal (BRS) in time into one OFDM symbol.

FIG. 7 illustrates generation of a single MRS. This construction can be done as a DFT precoded OFDM symbol with CP. With both TSS and BRS in the same OFDM symbol, the transmitter is able to change its beamforming between each OFDM symbol. Compared to having separate OFDM symbols for TSS and BRS, the time required for scanning a set of beam directions is halved. Both TSS and BRS will thus have shorter time durations as compared to separate OFDM symbols for each of them. Another way to represent the MRSs is shown in FIG. 8.

FIG. 8 illustrates MRS design in time and frequency domain. The transmission strategy for reference signals like MRSs can utilize the freedom in time and/or frequency and/or the code/sequence dimension. By transmitting these reference signals in orthogonal resources, the network may receive distinct measurement reports corresponding to these signals from the UE corresponding to the orthogonal reference signals.

SUMMARY

According to one example embodiment, a method in a wireless communications network is disclosed. In some cases, the method can be performed by one or a plurality of network nodes (e.g., an eNodeB), or by another network entity which may also be responsible for some other tasks related to the operations and maintenance (O&M) function. The method comprises assigning a node identifier to each of a plurality of nodes in the wireless communications network. The method comprises dividing a pool of possible mobility reference signal sequences into a plurality of mobility reference signal groups, and assigning each node of the plurality of nodes to one of the plurality of mobility reference signal groups. The method comprises configuring each node to select one or more mobility reference signal sequences from its assigned mobility reference signal group. In certain embodiments, one or more of the following may apply: (a) the method may comprise allocating, to each node, time/frequency locations on which each node is allowed to transmit mobility reference signals; (b) the node identifier may comprise an access node ID, an eNB ID, a gNB, or a cell ID; (c) the pool of possible mobility reference signal sequences may be divided based on beam reference IDs of the possible mobility reference signal sequences; (d) the plurality of mobility reference signal groups may have different numbers of mobility reference signal sequences; (e) configuring each node to select one or more mobility reference signal sequences from its assigned mobility reference signal group may comprise configuring each node to select one or more mobility reference signal sequences from its assigned mobility reference signal group via an inter-node signaling interface; (f) the method may comprise configuring one of the plurality of nodes either in real-time based on instantaneous network requirements or in advanced based on a pre-specified rule to reserve a subgroup of beam-reference IDs within its assigned mobility reference signal group; (g) the method may comprise lending the rights to use a subgroup of beam-reference IDs from one of the plurality of nodes to another one of the plurality of nodes via an inter-node signaling exchange; and (h) the method may comprise communicating information about the assigned node identifier for one or more of the plurality or nodes to a user equipment.

According to another example embodiment, a method in a network node is disclosed. The network node comprises one or more processors. The one or more processors are configured to assign a node identifier to each of a plurality of nodes in the wireless communications network. The one or more processors are configured to divide a pool of possible mobility reference signal sequences into a plurality of mobility reference signal groups, and assign each node of the plurality of nodes to one of the plurality of mobility reference signal groups. The one or more processors are configured to configure each node to select one or more mobility reference signal sequences from its assigned mobility reference signal group.

According to another example embodiment, a method in a node is disclosed. The method comprises deriving, based on a node identifier assigned to the node, one or more of time, frequency, time/frequency resource elements, and mobility reference signal beam indexes that the node is allowed to use for mobility reference signal transmissions. The method comprises selecting, from a mobility reference signal group assigned to the node, a subset of mobility reference signal sequences included in the assigned mobility reference signal group. The method comprises transmitting the selected mobility reference signals to one or more user equipment. In certain embodiments, one or more of the following may apply: (a) the node identifier may comprise an access node ID, an eNB ID, a gNB, or a cell ID; (b) the method may comprise reserving a subgroup of beam-reference IDs within the mobility reference signal group assigned to the node; and (c) the method may comprise: determining that a mobility reference signal collision has occurred; and using this information to perform one or wore operations related to ANR.

According to another example embodiment, a node is disclosed. The node comprises one or more processors. The one or more processors are configured to derive, based on a node identifier assigned to the node, one or more of: time, frequency, time/frequency resource elements, and mobility reference signal beam indexes that the node is allowed to use for mobility reference signal transmissions. The one or more processors are configured to select, from a mobility reference signal group assigned to the node, a subset of mobility reference signal sequences included in the assigned mobility reference signal group. The one or more processors are configured to transmit the selected mobility reference signals to one or more user equipment.

According to some embodiments, a method for use in a network node of transmitting reference signals in a wireless network using a plurality of beams comprises obtaining a node identifier for the network node. The node identifier is unique for neighboring network nodes within a particular coverage area of the wireless network. The method further comprises obtaining a group of reference signal sequences. The group comprises a subset of a pool of possible reference signal sequences for use in the wireless network. Each reference signal sequence is associated with a beam reference identifier. The method further comprises selecting a reference signal sequence from the obtained group: scrambling a reference signal transmission pattern using the obtained node identifier and the selected reference signal sequence with associated beam reference identifier; and transmitting the scrambled reference signal transmission pattern to a user equipment on one of the beams among the plurality of beams.

In particular embodiments, the method further comprises determining, based on the obtained node identifier, time or frequency resources for transmission of the scrambled reference signal transmission pattern for each beam of the plurality of beams. The node identifier may comprise one of an access node identifier, an eNodeB identifier, a gNodeB identifier, and a cell identifier.

In particular embodiments, a maximum number of reference signal sequences in the group of reference signal sequences is greater than a maximum number of beams in the plurality of beams. The group of reference signal sequences may comprise a group of reference signal sequences associated with odd numbered beam reference identifiers or a group of reference signal sequences associated with even numbered beam reference identifiers, a group of reference signal sequences associated with a contiguous range of beam reference identifiers, a group of reference signal sequences associated with a modulo n of the associated beam reference identifiers, or a group of reference signal sequences generated from a hash function performed on the associated beam reference identifiers.

In particular embodiments, the method further comprises communicating to another network node a subset of the group of reference signal sequences, that the other network node may use for transmitting reference signals.

In particular embodiments, the reference signal may comprise a mobility reference signal (MRS) or a channel state information reference signal (CSI-RS).

According to some embodiments, a network node capable of transmitting reference signals on a plurality of beams in a wireless communication network comprises a memory coupled to a processor. The processor is operable to obtain a node identifier for the network node. The node identifier is unique for neighboring network nodes within a particular coverage area of the wireless communication network. The processor is further operable to obtain a group of reference signal sequences. The group of reference signal sequences comprises a subset of a pool of possible reference signal sequences for use in the wireless communication network. Each reference signal sequence is associated with a beam reference identifier. The processor is further operable to select a reference signal sequence from the obtained group of reference signal sequences; scramble a reference signal transmission pattern using the obtained node identifier and the selected reference signal sequence with associated beam reference identifier; and transmit the scrambled reference signal transmission pattern to a user equipment on one of the beams among the plurality of beams.

In particular embodiments, the processor is further operable to determine, based on the obtained node identifier, time or frequency resources for transmission of the scrambled reference signal transmission pattern for each beam of the plurality of beams. The node identifier may comprise one of an access node identifier, an eNodeB identifier, a gNodeB identifier, and a cell identifier.

In particular embodiments, a maximum number of reference signal sequences in the group of reference signal sequences is greater than a maximum number of beams in the plurality of beams. The group of reference signal sequences may comprise a group of reference signal sequences associated with odd numbered beam reference identifiers or a group of reference signal sequences associated with even numbered beam reference identifiers, a group of reference signal sequences associated with a contiguous range of beam reference identifiers, a group of reference signal sequences associated with a modulo n of the associated beam reference identifiers, or a group of reference signal sequences generated from a hash function performed on the associated beam reference identifiers.

In particular embodiments, the processor is further operable to communicate to another network node a subset of the group of reference signal sequences that the other network node may use for transmitting reference signals.

In particular embodiments, the reference signal comprises a mobility reference signal (MRS) or a channel state information reference signal (CSI-RS).

According to some embodiments, a network node capable of transmitting reference signals on a plurality of beams in a wireless communication network comprises a determining module, a communication module, and a receiving module. The receiving module is operable to obtain a node identifier or the network node. The node identifier is unique for neighboring network nodes within a particular coverage area of the wireless communication network. The receiving module is further operable to obtain a group of reference signal sequences. The group of reference signal sequences comprise a subset of a pool of possible reference signal sequences for use in the wireless communication network. Each reference signal sequence is associated with a beam reference identifier. The determining module is operable to select a reference signal sequence from the obtained group of reference signal sequences, and scramble a reference signal transmission pattern using the obtained node identifier and the selected reference signal sequence with associated beam reference identifier. The communication module is operable to transmit the scrambled reference signal transmission pattern to a user equipment on one of the beams among the plurality of beams.

Also disclosed is a computer program product. The computer program product comprises instructions stored on non-transient computer-readable media which, when executed by a processor, perform the step of obtaining a node identifier for the network node. The node identifier is unique for neighboring network nodes within a particular coverage area of the wireless network. The instructions are further operable to perform the step of obtaining a group of reference signal sequences. The group comprises a subset of a pool of possible reference signal sequences for use in the wireless network. Each reference signal sequence is associated with a beam reference identifier. The instructions are further operable to perform the steps of selecting a reference signal sequence from the obtained group; scrambling a reference signal transmission pattern using the obtained node identifier and the selected reference signal sequence with associated beam reference identifier; and transmitting the scrambled reference signal transmission pattern to a user equipment on one of the beams among the plurality of beams.

Certain embodiments of the present disclosure may provide one or more technical advantages. For example, certain embodiments may advantageously simplify network planning of a beam-based system substantially because particular embodiments avoid the planning of multiple MRSs per node.

As another example, certain embodiments may advantageously facilitate using the same planning tools, techniques, and algorithms in NR as used in LTE. Accordingly, the usage/allocation of MRSs by multiple nodes may not need coordination because the collisions may be avoided by transmitting the MRS in different time/frequency resources and the MRS may use different beam reference IDs. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 17 is a block schematic of an exemplary radio network controller or core network node, in accordance with certain embodiments;

FIG. 18 is a block schematic of an exemplary wireless device, in accordance with certain embodiments; and FIG. 19 is a block schematic of an exemplary network node, in accordance with certain embodiments.

DETAILED DESCRIPTION

As described above, the primary synchronization signal (PSS) and the secondary synchronization signal (SSS) encode the physical cell identifier (PCI) and are used for the synchronization procedure in long term evolution (LTE). Proper PCI planning can be used to resolve problems that may arise, such as PCI collision and conflict. New attributes for 5G new radio (NR), however, such as the need to massively rely on beamforming, may create problems for the principles applied in LTE for synchronization.

5G NR uses beamforming. NR may use frequency ranges up to 100 GHz. In comparison to the frequency bands allocated to LTE, some of the new bands will have more challenging propagation properties, such as lower diffraction and higher outdoor/indoor penetration losses. Consequently, signals will have less ability to propagate around corners and penetrate through walls. In addition, in high frequency bands atmospheric/rain/foliage attenuation and higher body losses render the coverage of NR signals even spottier. Fortunately, the operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will massively rely on beamforming to provide coverage. NR may be referred to as a beam-based system.

In addition, NR may support different antenna architectures such as analog, hybrid and digital. The different antenna architectures may include limitations in terms of how many directions can be covered simultaneously, especially in the case of analog/hybrid beamforming. To find a good beam direction at a given Transmission Reception Point (TRP)/access node/antenna array, a beam-sweep procedure is typically employed.

Figure 1:
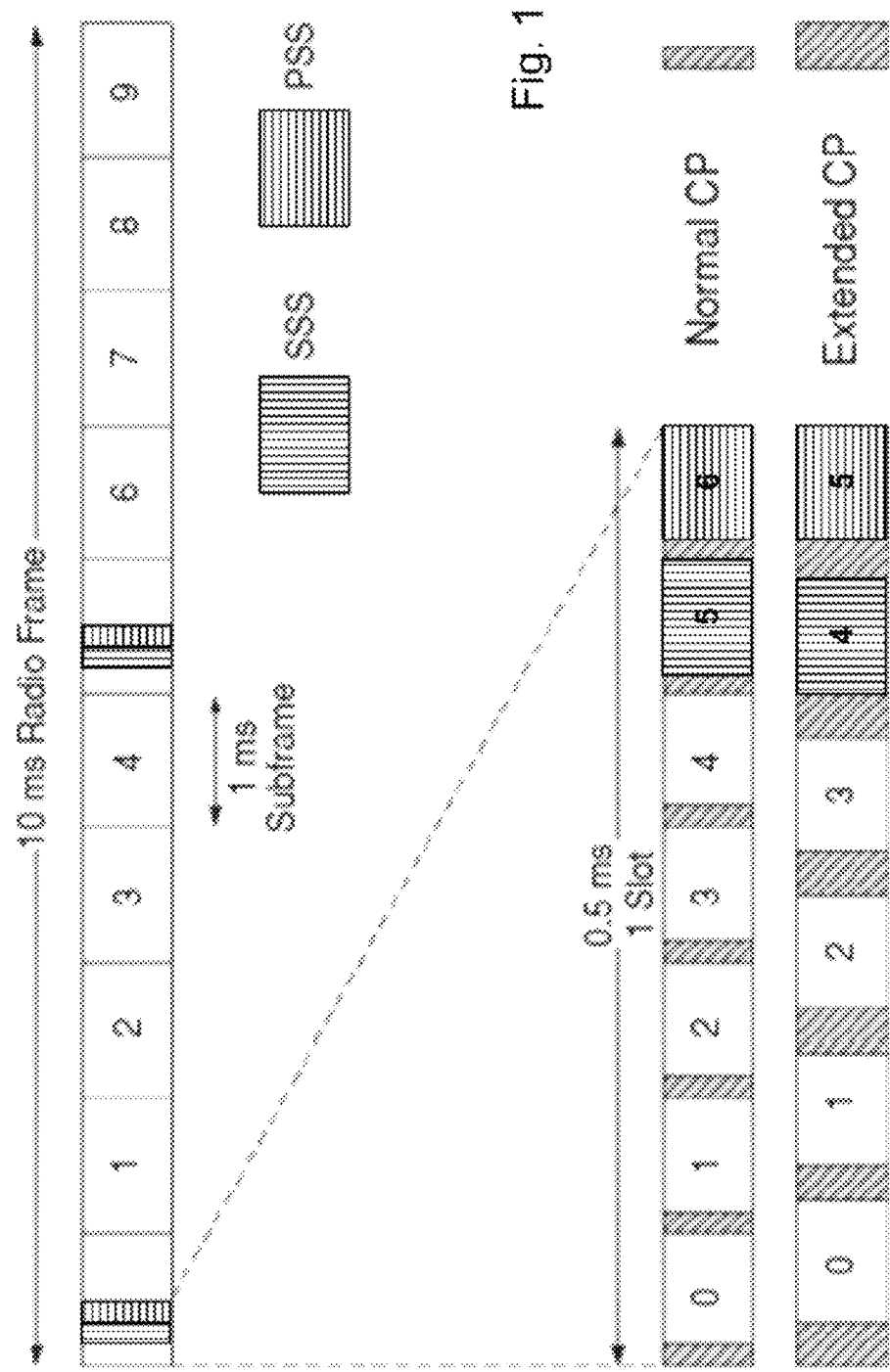
FIG. 1 illustrates an example of PSS and SSS frame and slot structure in time domain in the FDD case.
Figure 2:
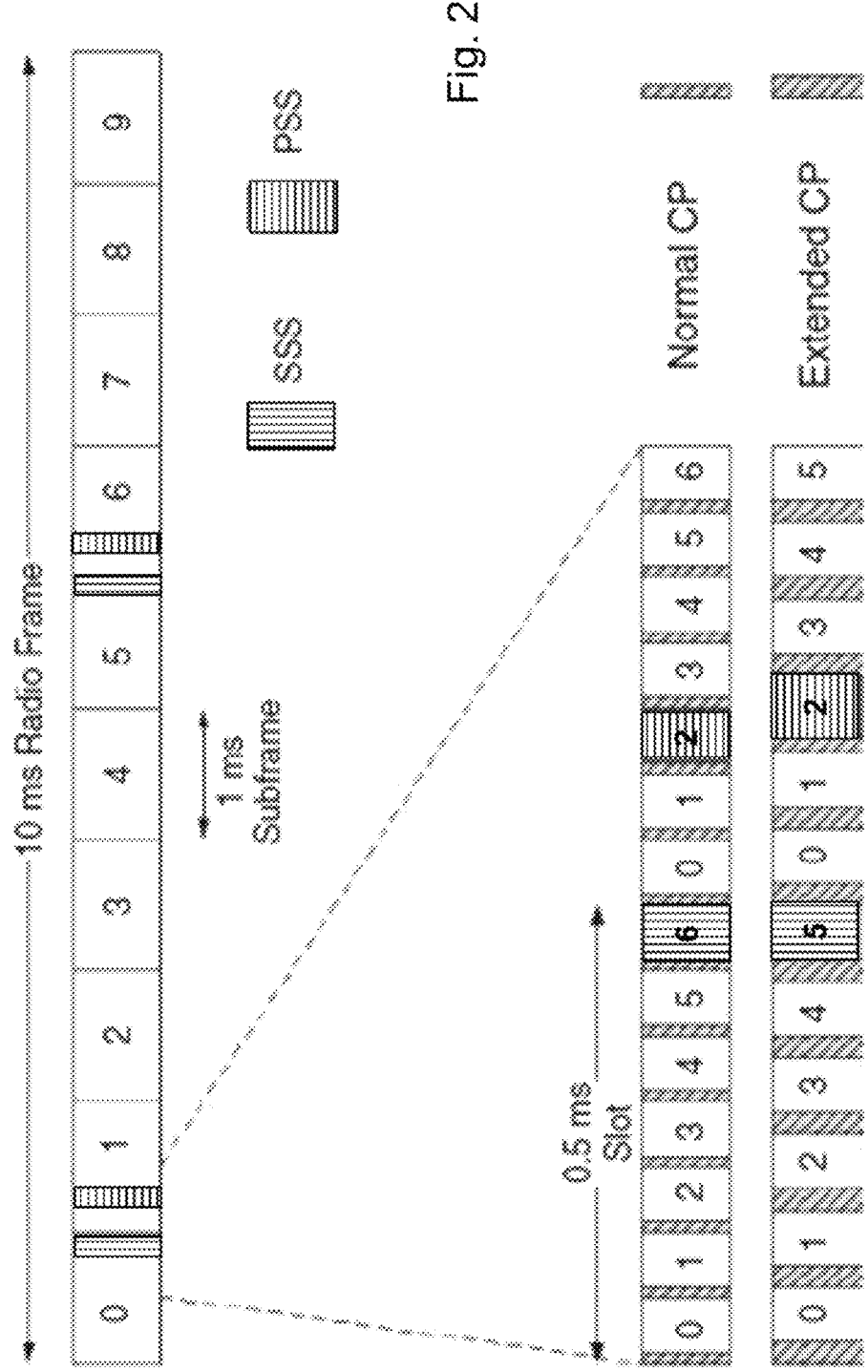
FIG. 2 illustrates an example of PSS and SSS frame and slot structure in the TDD case.
Figure 3:
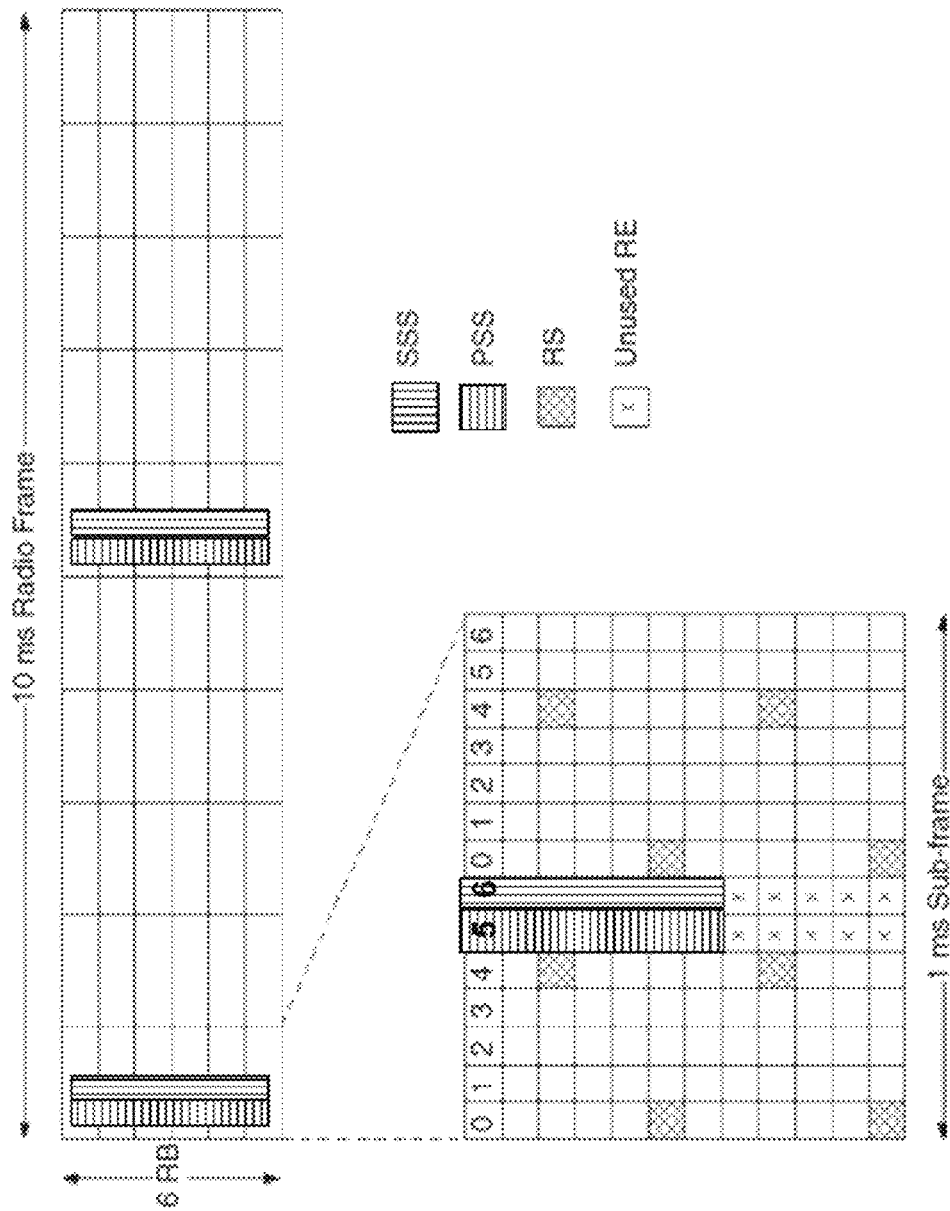
FIG. 3 illustrates an example of PSS and SSS frame structure in frequency and time domain for an FDD cell.
Figure 4:
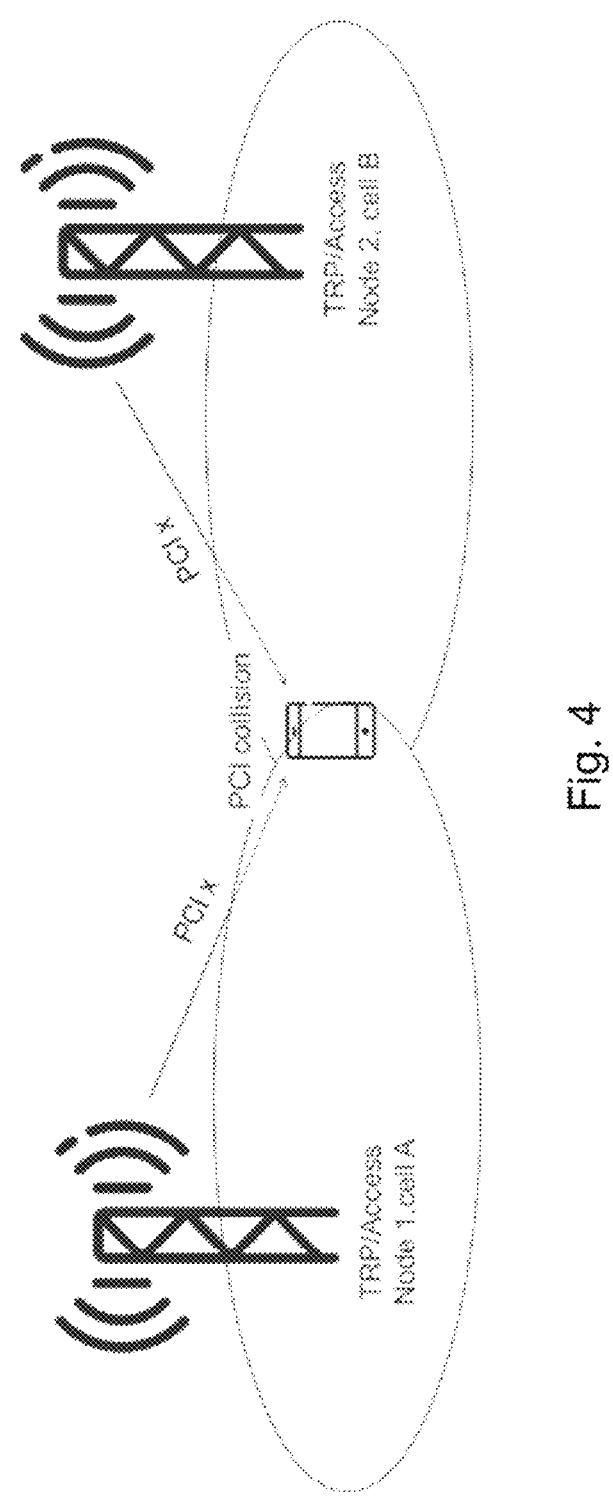
FIG. 4 illustrates an example of PCI collision.
Figure 5:
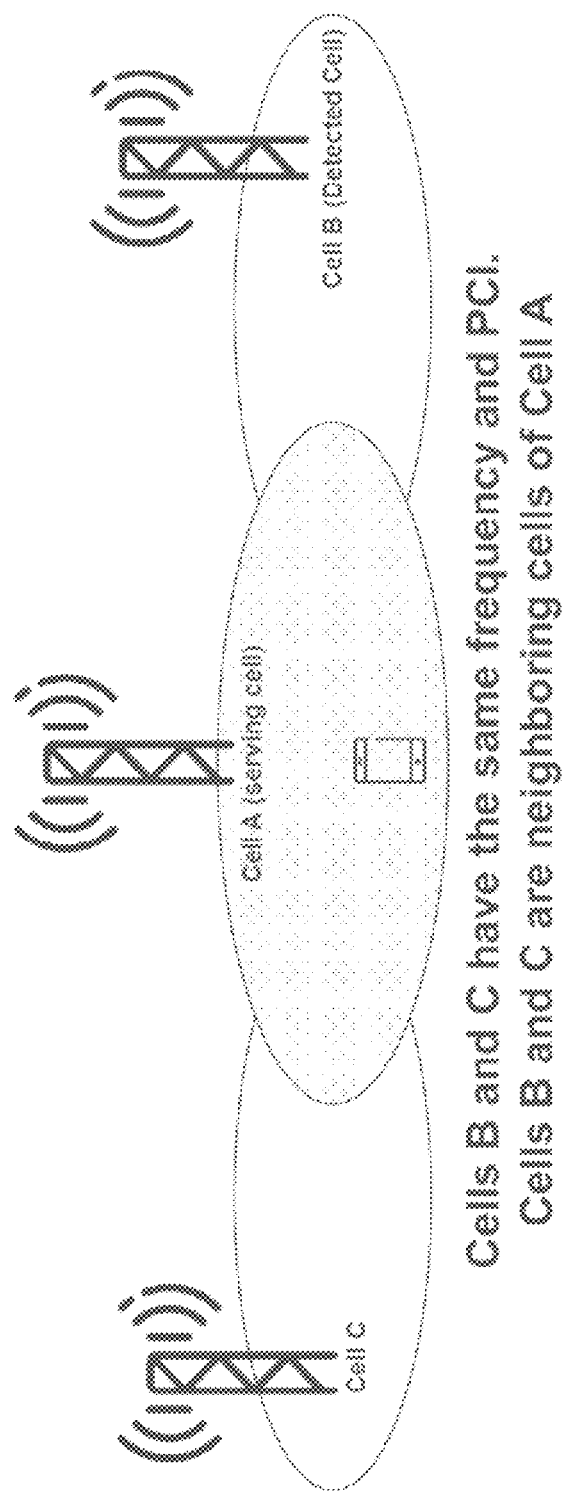
FIG. 5 illustrates an example of PCI confusion.
Figure 6:
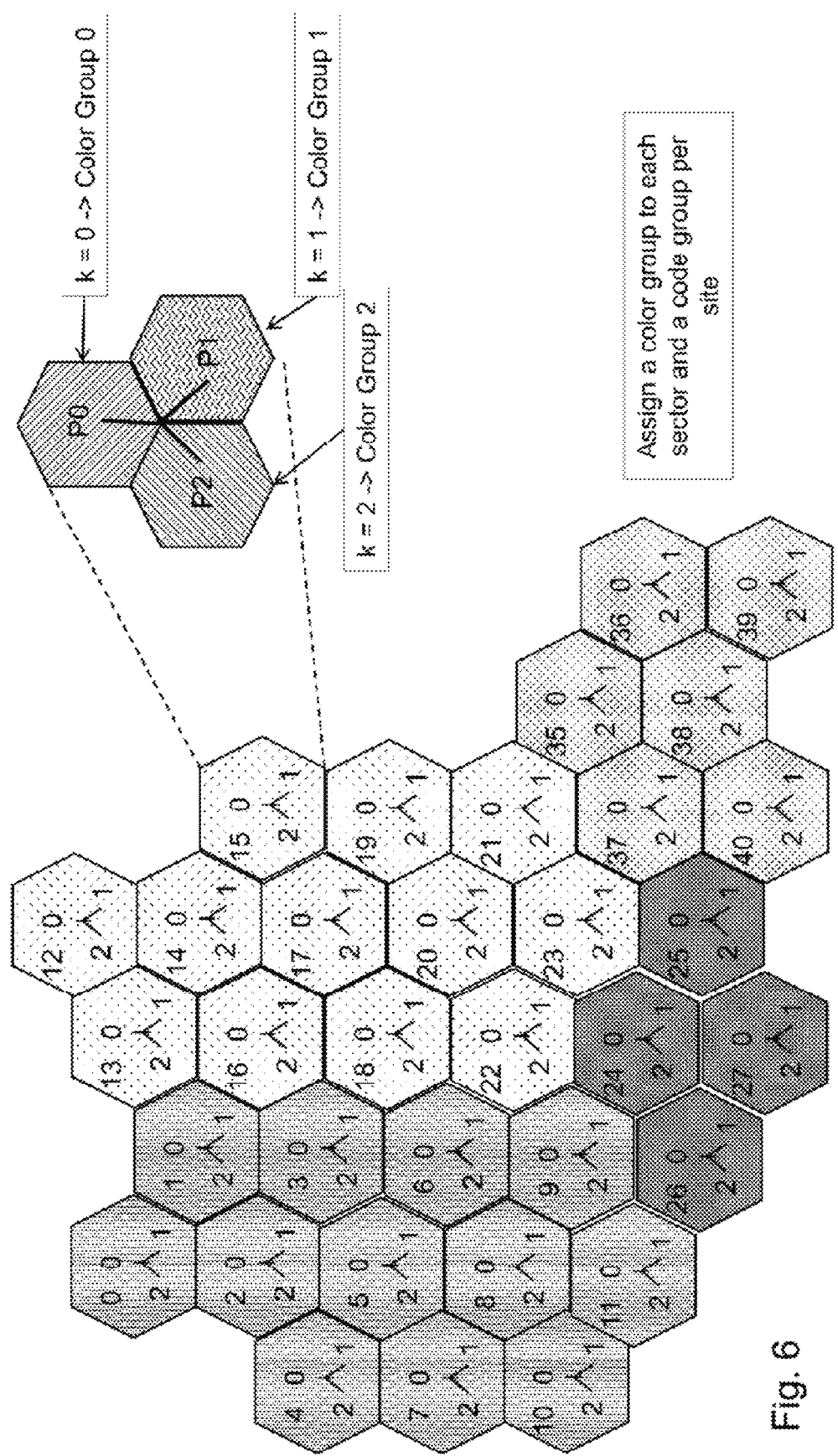
FIG. 6 illustrates an example of a few clusters with their assigned PCI to avoid conflict and collisions.
Figure 7:
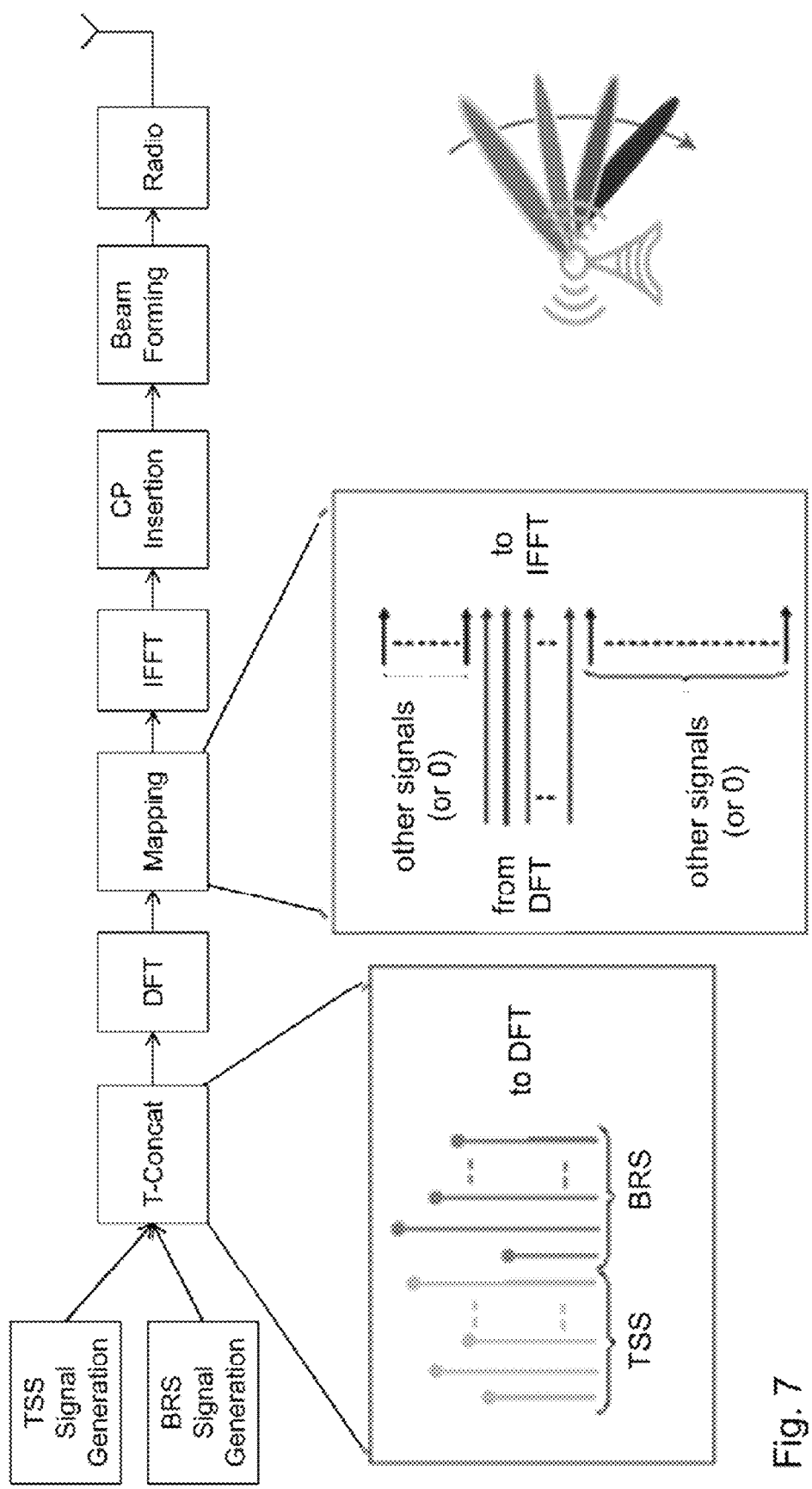
FIG. 7 illustrates generation of a single MRS.
Figure 8:
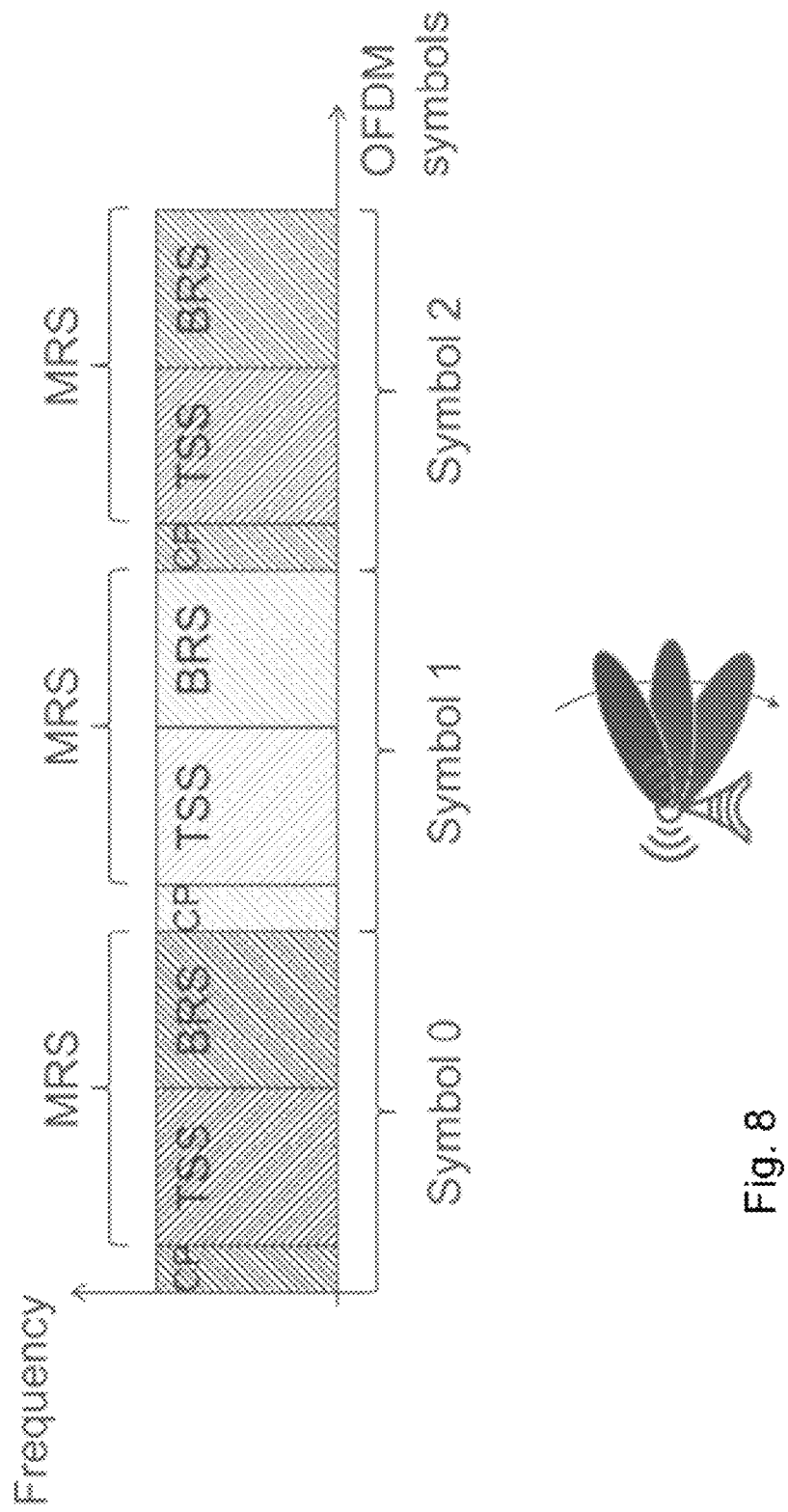
FIG. 8 illustrates MRS design in time and frequency domain.
Figure 9:
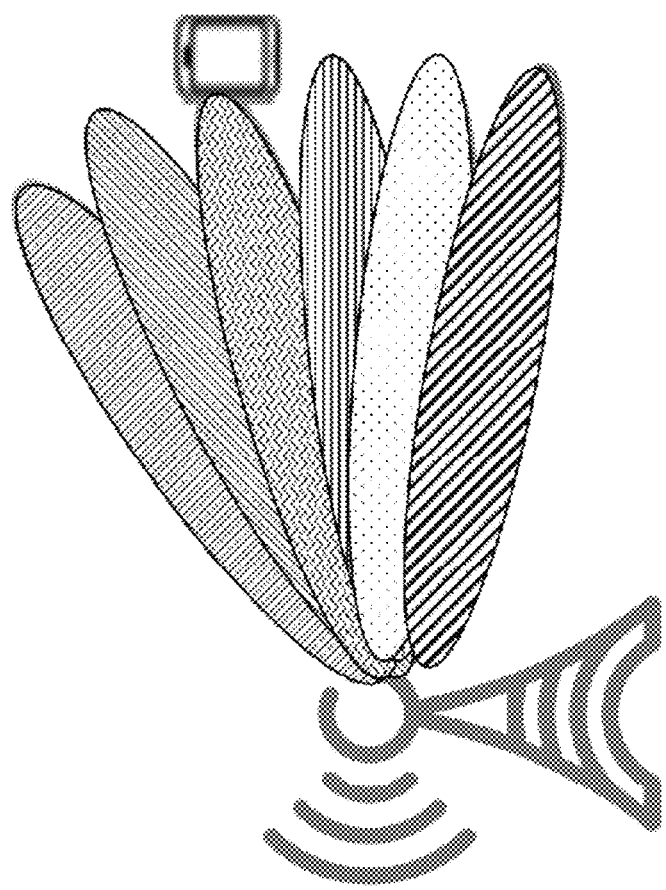
FIG. 9 illustrates an example beam sweeping procedure, in accordance with certain embodiments.

FIG. 9 illustrates an example beam sweeping procedure, in accordance with certain embodiments. A typical example of a beam-sweep procedure is that the node points a beam containing a synchronization signal and/or beam identification signal, in each possible direction, one or few direction(s) at a time, as shown in FIG. 9.

In addition to the beam-based design, 5G NR may include decoupling between Idle and Connected connectivity. Some access nodes (or TRPs) may be configured to support only "RRC Connected" UEs (i.e., cannot be used for initial access or UE-based mobility). Similarly, other nodes may be configured to only support "RRC Idle" UEs or both "RRC Idle" and "RRC Connected" UEs. This affects the kind of signals and identifiers the nodes can transmit in different configurations.

Derived from the decoupling concept, an NR Cell, to be discovered and used by Idle UEs, should be defined by a Cell Identifier possibly encoded by one set of synchronization sequences, like PSS and SSS from which UE gets synchronization. Based on the identifier, the UE is able to obtain system information (SI) and learn how to access the system. On the other hand, it may not be necessary to define an NR Cell for RRC Connected mode UEs. Instead, UEs may switch across multiple beams (which can be narrower or wider, depending on the network configurations) and identifiers are not derived from previously acquired information, such as the Cell ID in LTE. This directly impacts the way synchronization procedures are performed, because in LTE a UE maintains synchronization with a cell thanks to the PSS/SSS encoding the concept of a cell.

5G NR may include multiple synchronization sources. In LTE, a UE in RRC Connected mode obtains its source synchronization from the PSS/SSS, which is used to derive the PCI. The UE is said to be connected to a Cell in RRC Connected state. As described above, in NR the concept of a cell is not needed for connected mode UEs.

To resolve the synchronization problem in a beam-based system with the lack of a defined NR cell for Connected mode UEs, NR may use multiple sets of synchronization sequences as a synchronization source. Such an approach is described in co-pending U.S. Provisional Application 62/373,929 filed Aug. 11, 2016, which is hereby incorporated by reference in its entirety.

The multiple sets of synchronization sequences may be multiple MRSs. For example, or any other suitable reference signal such as a CSI-RS. In general, a network node transmits one or multiple sets of synchronization sequences to be used by UEs as their synchronization source for time and frequency synchronization in the downlink. The UE may autonomously use any of the sequence sets as its synchronization source, which can be used to, among other things, keep synchronized when the UE moves across the coverage of the different sets of sequences being transmitted by the same transmission reception point (TRP) or access node. The UE and the network may obtain the set of sequences associated to a given UE and update procedures (e.g., in the case of mobility and/or node optimization and other usage of these sets of synchronization source).

Figure 10:
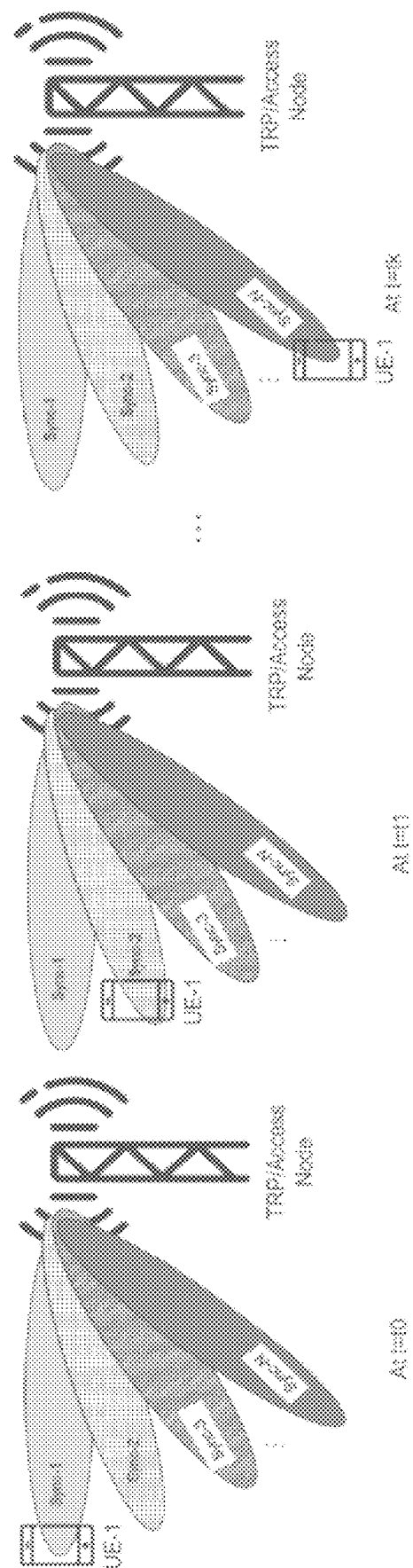
FIG. 10 illustrates examples in which a UE considers itself synchronized with the source in different times.

FIG. 10 illustrates examples in which a UE considers itself synchronized with the source in different times. More particularly, FIG. 10 illustrates examples in which the UE considers itself synchronized with the source in different times t0, t1, and tk.

If the sequences to be used for that purpose, for example the MRSs, are designed like the PSSs/SSSs in LTE (e.g., transmitted twice per 10 ms radio frame and within the central 6 Physical Resource Blocks (PRBs) in the center of the frequency carrier), a sequence planning like the PCI planning in LTE would need to be defined.

However, the problem in NR (especially in the higher frequency deployments) is more challenging. This is because some nodes may need to define very narrow beams to transmit multiple MRSs. This would be equivalent to defining a much higher number of cell sectors in LTE per node/site, which would make the MRS planning a much more difficult task if it is desired to avoid/minimize the MRS collision probability and MRS confusion, to support a kind of ANR feature.

One possible approach to address the problem is to associate each node/TRP/cell with an identifier (e.g., access node ID, eNB ID, gNB, cell ID, etc.) that is used to scramble different time-frequency-code resources used for MRS transmission. Such an approach is described in the related U.S. Provisional Application 62/374,444, filed Aug. 12, 2016, which is hereby incorporated by reference in its entirety. In the disclosed embodiments, appropriately assigning node-IDs can minimize the MRS collision and confusion. Thus, the problem is reduced to assigning node-IDs smartly. However, such assignment still requires some level of planning. The problem is more significant in NR because NR is heavily reliant on beamforming and it is often hard to associate neighboring beams in advance (two beams from far away nodes may interfere with each other despite the far distance between their corresponding transmission points).

The present disclosure includes various embodiments that may address these concerns. The various embodiments described herein can be used as a stand-alone solution or can be combined with the existing approach described above to further reduce network planning. In certain embodiments, this is achieved by dividing the MRS sequences based on their respective beam-reference IDs into several groups. The groups are allocated to the nodes based on their node IDs, such that neighboring nodes are assigned different MRS ranges. In certain embodiments, the MRS resources may be assigned in two steps: first, the time/frequency allocation of MRSs are assigned using any of a number of potential approaches (such as those described in co-pending application 62/374,444). Second, the MRS sequences are divided based on their respective beam-reference IDs into several groups. These groups are allocated to the nodes randomly (or based on the node ID), hence introducing a second level of randomization which further reduces the chance of MRS collision.

The various embodiments described herein may have one or more technical advantages. For example, certain embodiments may advantageously simplify network planning of a beam-based system substantially because particular embodiments avoid the planning of multiple MRSs per node. Instead, a simple node ID planning is used. As another example, certain embodiments may advantageously allow the same planning tools, techniques and algorithms to be applied in NR as used in LTE. By doing that, the usage/allocation of MRSs by multiple nodes may not need coordination because the collisions may be avoided by the fact that they would be transmitted in different time/frequency resources, and even if in the same time/frequency resources, the reference signals may use different beam reference IDs. Other advantages may be readily apparent to one having skill in the art. Certain embodiments may have none, some, or all of the recited advantages.

Figure 11:
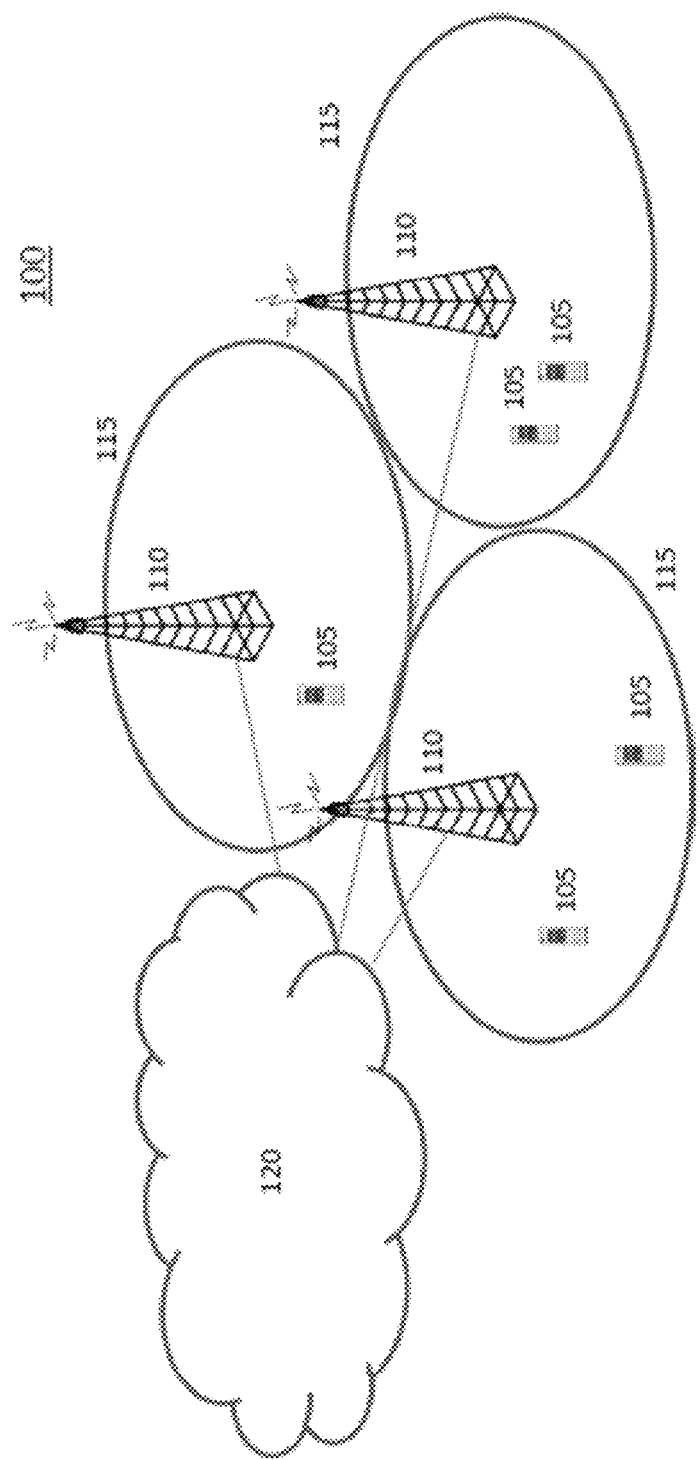
FIG. 11 is a schematic diagram of an exemplary wireless communications network, in accordance with certain embodiments.

FIG. 11 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU). Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

In certain embodiments, the generic terminology "node" is used. It can refer to any type of node, including the UE, network node, and radio network node described above. The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 14-18.

Although FIG. 11 illustrates a particular arrangement of network 100, various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to NR, LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

In certain embodiments, a single ID is allocated per node. From the allocated ID, the node can derive the time, frequency, or time/frequency resource elements, as well as the MRS beam indexes, that the node may use for MRS transmissions. The node selects a subset of MRSs to be transmitted. The file node transmits the selected MRSs. The selected MRSs can be transmitted in any suitable manner. As one example, the node can transmit the selected MRSs on demand. As another example, the node can transmit the selected MRSs periodically without necessarily needing to coordinate with the neighbor nodes which MRSs are being used since the MRSs can be self-detectable by the UEs.

Particular embodiments may assign node identifiers. In certain embodiments, each node/TRP/cell is associated to a node identifier. The node identifier may be any suitable identifier. Examples of node identifiers include, but are not limited to, an access node ID, an eNB ID, a gNB, a cell ID, or any other suitable node identifier. The node identifier is used to scramble the MRS transmission patterns (as described in more detail below). The node identifier is generally transparent to the UEs (i.e., the UE does not need to be aware of this identifier). It is possible, however, that the network might inform the UEs about the node identifiers for other purposes (such as, for example, building ANR tables).

Particular embodiments include MRS sequence ranging based assignments. In certain embodiments, the MRS sequences are divided into several groups. The MRS sequences may be divided into several groups based on any suitable criteria. In certain embodiments, the MRS sequences may be divided into several groups based on the beam reference IDs. As one example, MRS sequences can be divided into two groups based on whether their beam reference ID is even or odd. As another example, another possible allocation is to divide the MRS sequences into n groups based on the remainder (modulo) of the beam identifier index and n. As still another example, the grouping can be based on the beam ID range. That is, the first k beam IDs are grouped as group1, the next k beam IDs as group2, and so forth. As yet another example, it is also possible for the grouping to use a predefined hash function (for example a mid-square function) using as input arguments node ID or beam ID.

Each node may be assigned to one such MRS group based on the node ID described above. The node then select its MRS sequences from the allocated group. Note that in general, the number of available MRS sequences in each group is more than the number of MRSs transmitted by a node. Therefore, the node is free on choosing the MRS sequences within the allocated group.

In certain embodiments, time/frequency locations are first allocated on which different nodes are allowed to transmit their MRSs. This can be done in any suitable manner. For example, the time/frequency locations can be allocated using any of the procedures described in co-pending application 62/374,444. More specifically, the allocated node identifier may be used to scramble the frequency/time block (e.g., a subset of the downlink PRBs) used to transmit the MRSs.

Figure 12:
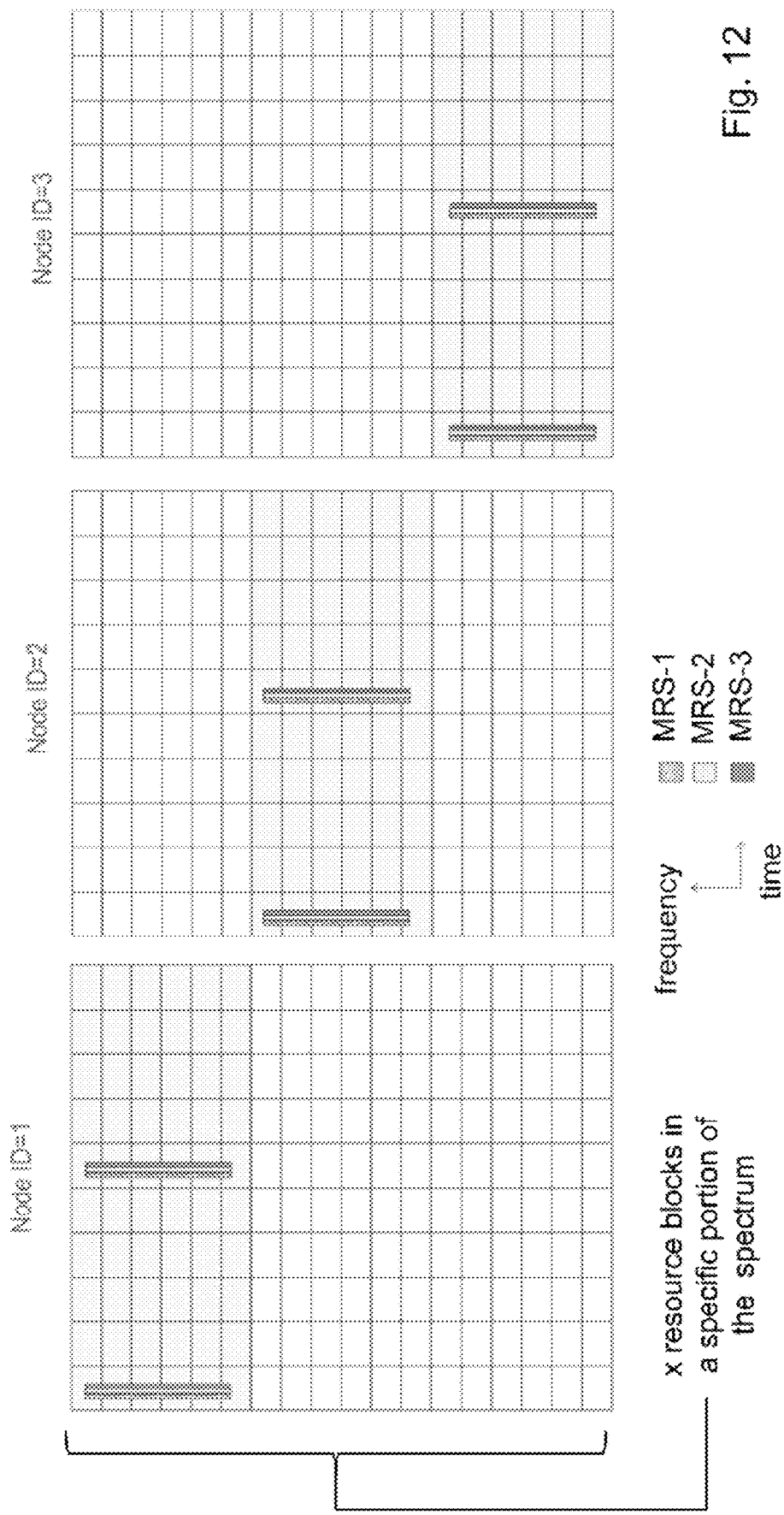
FIG. 12 illustrates example frequency blocks used to transmit MRSs derived from the Node ID.

FIG. 12 illustrates example frequency blocks used to transmit MRSs derived from the Node ID. As shown in the example of FIG. 12, three nodes are allocated 3 node IDs (i.e., Node ID=1, Node ID=2, Node ID=3), where each of the IDs is associated to a specific subset of PRBs to be used for MRSs' transmission.

In the second level of MRS allocation, the MRS sequences are divided into several groups based on the beam reference IDs, as described above. Then, each node is assigned one such MRS group. That is, the node will select its MRS sequences from the allocated group. Advantageously, this will create yet another level of MRS allocation which will further reduces the chance of MRS collision.

Particular embodiments include MRS collision avoidance. Particular embodiments described herein advantageously minimize the chance of MRS collision. In particular, if particular embodiments are combined with the methods to minimize network planning in a beam-based system described in co-pending application 62/374,444, there are two levels of randomization involved in choosing the MRS sequences by each node. Even when two neighbors are allocated the same part of time/frequency grid and the same set of MRS sequences, because the nodes choose the beam indexes from a set with a larger number of available sequences than the MRS sequences transmitted by the node, there is a chance that no MRS collision happens. However, when a UE detects an MRS collision, the information can be used for MRS collision avoidance by changing the MRS allocation assignments of the nodes involved.

Particular embodiments include neighbor relation establishment. According to embodiments described herein, MRS collision may be avoided because neighbor nodes will be assigned different MRS ranges. Therefore, an MRS collision might be an indication of the existence of an unknown neighbor. In case of an MRS collision, the network can use this information to help the ANR establishment procedures.

Particular embodiments may include grouping MRS in relation to the MRS transmissions of the nodes. For example, different nodes may turn-on different numbers of MRSs. Thus, the MRSs can be divided into different groups with different numbers of MRS sequences. In certain embodiments, for example, there can be 6 MRS groups (Groups 1-6), where Groups 1, 2 and 3 each have 20 MRS sequences (with BRS indexes ranging from 0-19, 20-39 and 40-59 for each group, respectively) and Groups 4, 5 and 6 each have 10 MRS sequences (with BRS indexes ranging from 60-69, 70-79 and 80-89, respectively). The nodes that transmit, for example, (5-10) MRS sequences may be assigned to the first three groups and nodes that transmit fewer MRS sequences may be assigned to the last three groups.

Particular embodiments include MRS sub-group lending/exchange among neighbor nodes. In certain embodiments, the network may or may not assign an equal number of beam-reference IDs to each node. This difference may be related to the planned coverage area for each TRP and/or the number of available antenna ports among other factors. As opposed to the PCI collision/confusion in LTE, the collision of MRS in NR will also be dependent on the set of active beams at each TRP. This is because an MRS transmission on a beam can be turned on and turned off dynamically.

In certain embodiments, each node may reserve a sub-group of beam-reference IDs within its assigned MRS grouping and may lend the said subgroup of MRS IDs with one or more neighbor node(s). The subgrouping may advantageously improve the collision avoidance of MRS, especially in networks where load-balancing may be needed. If a node needs to activate many beams because of a large number of active users in its vicinity, the risk for MRS collision with another high-traffic neighbor node may increase. In such instances, another neighbor node that happens to have low user traffic may lend some of its BRS IDs from its own assigned MRS grouping.

The subgrouping may be configured in any suitable manner. As one example, in certain embodiments the subgrouping in a BRS ID group may be configured in real-time. As another example, in certain embodiments the subgrouping in a BRS ID group may be pre-configured based on a further specified rule.

The real-time configuration of MRS subgrouping may require some inter-node signaling exchange, which may comprise a "request to borrow" message, a grant message, and/or an ACK/NACK message. A pre-configuration scheme for MRS subgrouping may be similar to the scheme used for MRS grouping (e.g., a rule based on even/odd BRS IDs, based on the remainder of BRS ID divisions, based on the range of BRS IDs, or other suitable rule).

Figure 13:
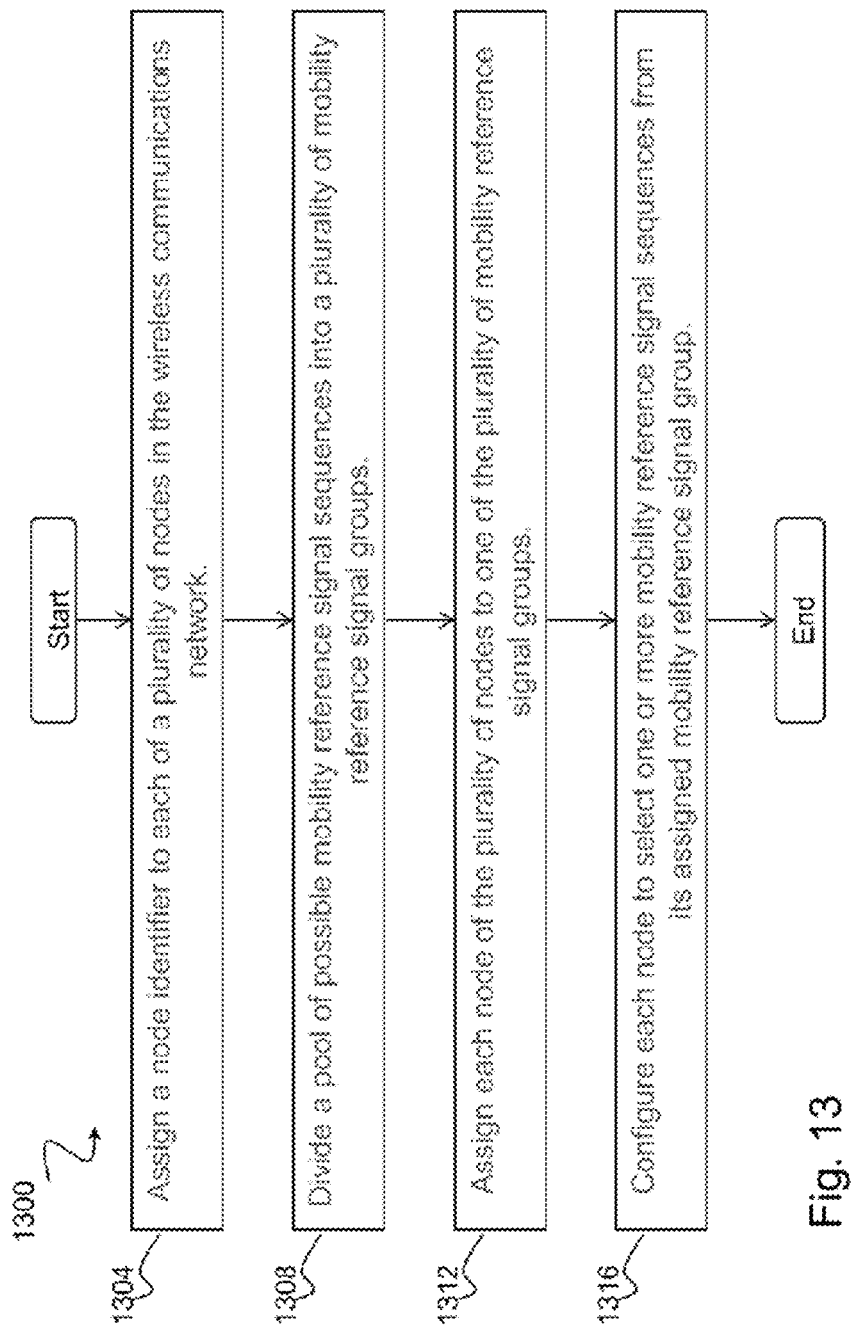
FIG. 13 is a flow diagram of a method in a wireless communications network, in accordance with certain embodiments.

FIG. 13 is a flow diagram of a method in a wireless communications network, in accordance with certain embodiments. At step 1304, a node identifier is assigned to each of a plurality of nodes in the wireless communications network. At step 1308, a pool of possible mobility reference signal sequences is divided into a plurality of mobility reference signal groups. At step 1312, each node of the plurality of nodes is assigned to one of the plurality of mobility reference signal groups. At step 1316, each node is configured to select one or more mobility reference signal sequences from its assigned mobility reference signal group.

Figure 14:
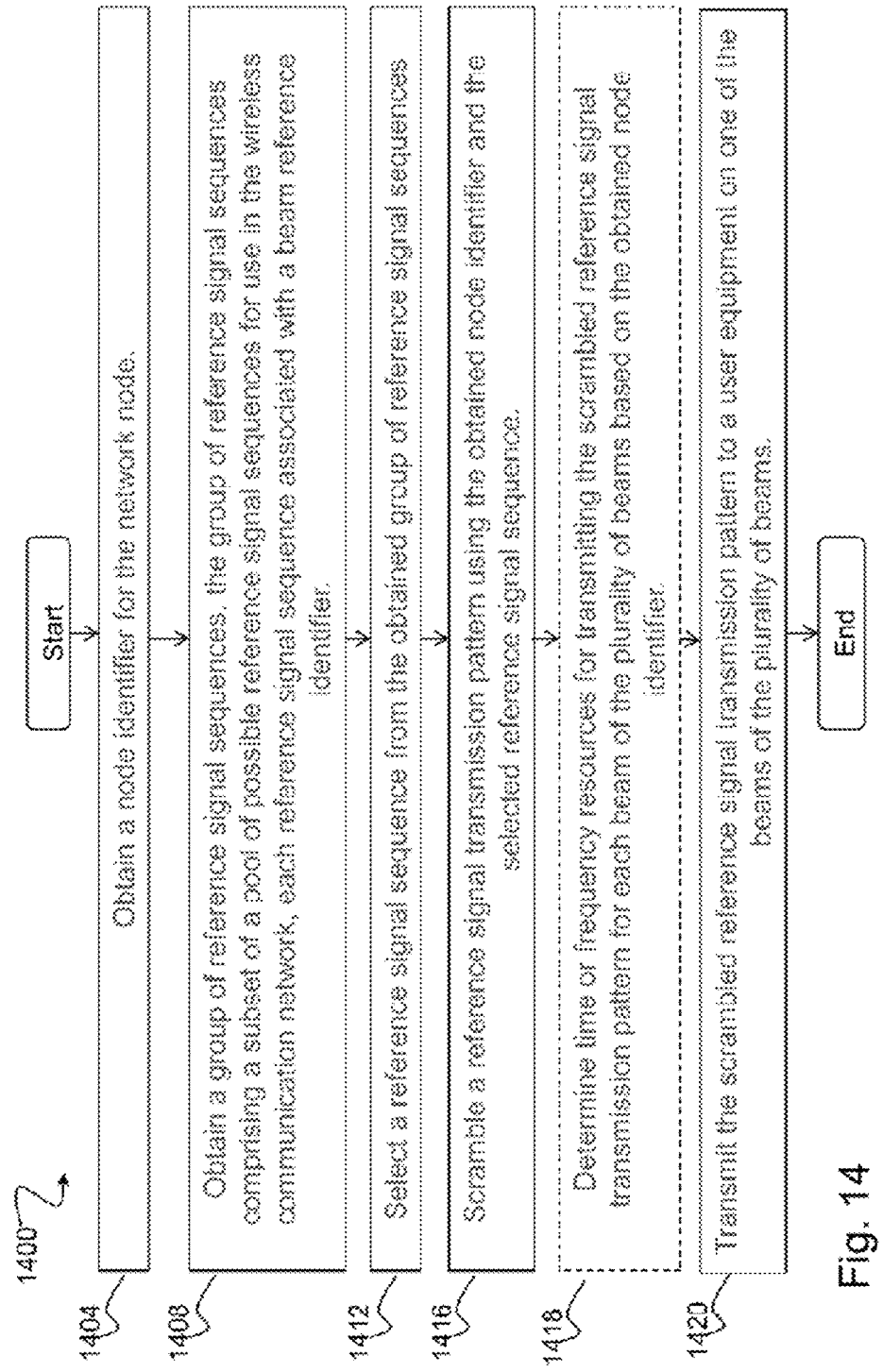
FIG. 14 is a flow diagram of a method in a network node, in accordance with certain embodiments.

FIG. 14 is a flow diagram of a method in a network node, in accordance with certain embodiments. In particular embodiments, one or more steps of method 1400 may be performed by components of wireless network 100 described with reference to FIG. 11.

The method begins at step 1404, where a network node obtains a node identifier for the network node. The node identifier is unique for neighboring network nodes within a particular coverage area of the wireless communication network. For example network node 115 may obtain a node identifier from another node, such as a core network node. The node identifier may not be unique within network 100, but may uniquely identify network node 115 from neighboring network nodes 115. In particular embodiments, the node identifier may include an access node identifier, an eNodeB identifier, a gNodeB identifier, a cell identifier, or any other suitable identifier.

At step 1408, the network node obtains a group of reference signal sequences. The group of reference signal sequences comprises a subset of a pool of possible reference signal sequences for use in the wireless communication network. Each reference signal sequence is associated with a beam reference identifier. For example, network 100 may include a pool of reference signal sequences. The reference signal sequences may be divided based on their respective beam-reference IDs into several groups. The groups may be allocated to the nodes randomly (or based on the node ID), which reduces the chance of reference signal collision.

In particular embodiments, the group of reference signal sequences comprises a group of reference signal sequences associated with odd numbered beam reference identifiers or a group of reference signal sequences associated with even numbered beam reference identifiers, a group of reference signal sequences associated with a contiguous range of beam reference identifiers, a group of reference signal sequences associated with a modulo n of the associated beam reference identifiers, a group of reference signal sequences generated from a hash function performed on the associated beam reference identifiers or any other suitable grouping as described above.

In particular embodiments, the grouping may be performed by a core network node, or provisioned by a network operator using any suitable provisioning interface.

At step 1412, the network node selects a reference signal sequence from the obtained group of reference signal sequences. For example, network node 115 may select particular reference signal sequences from the group of reference signal sequences assigned to network node 115. The group of reference signal sequences may exceed the number of beams that network node 115 is configured to transmit. In such a configuration, network node 115 is free to select any suitable subset of reference signal sequences from the group for assigning to particular beams.

At step 1416, the network node scrambles a reference signal transmission pattern using the obtained node identifier and the selected reference signal sequence with its associated beam reference identifier. For example, network node 115 may scramble a reference signal transmission pattern by scrambling the reference signal sequence with the node identifier according to any of the examples described above.

At step 1418, the network node may determine time or frequency resources for transmitting the scrambled reference signal transmission pattern for each beam of the plurality of beams based on the obtained node identifier. For example, a first network node 115 may optionally allocate various time frequency resources for transmitting each of its beams. A second network node 115, with a different node identifier, may allocate a different set of time frequency resources for transmitting each of its beams. An advantage of determining different time frequency resources is to provide a second level of randomization to avoid collisions or confusions among reference signals.

At step 1420, the network node transmits the scrambled reference signal transmission pattern to a user equipment on one of the beams of the plurality of beams. For example, network node 115 may transmit a beam with the scrambled reference signal transmission pattern to wireless device 110.

Modifications, additions, or omissions may be made to method 1400 illustrated in FIG. 14. Additionally, one or more steps in method 1400 may be performed in parallel or in any suitable order.

Figure 15:
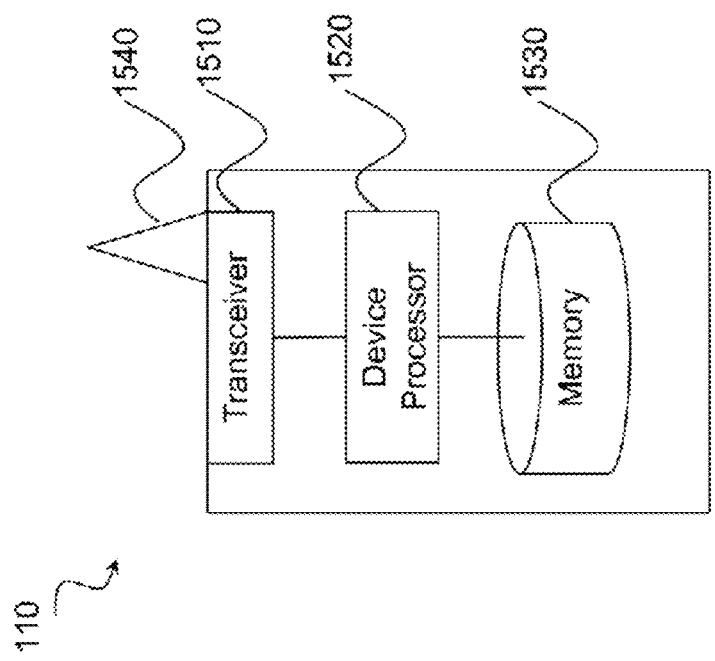
FIG. 15 is a block schematic of an exemplary wireless device, in accordance with certain embodiments.

FIG. 15 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1510, processor 1520, and memory 1530. In some embodiments, transceiver 1510 facilitates transmitting wireless signals to and receiving wireless signals from network node 115 (e.g., via antenna 1540), processor 1520 executes instructions to provide some or all of the functionality described above as being provided by wireless device 110, and memory 1530 stores the instructions executed by processor 1520.

Processor 1520 may include any suitable combination of hardware and software implemented in one or more modules to execute instructions and manipulate data to perform some or all of the described functions of wireless device 110, such as the functions of wireless device 110 described above in relation to FIGS. 1-14. In some embodiments, processor 1520 may include, for example, one or more computers, one or more central processing units (CPUs), one or more microprocessors, one or more applications, one or more application specific integrated circuits (ASICs), one or more field programmable gate arrays (FPGAs) and or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and or computer-executable memory devices that store information, data, and/or instructions that may be used by processor 1520.

Other embodiments of wireless device 110 may include additional components beyond those shown in FIG. 15 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 1520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 16:
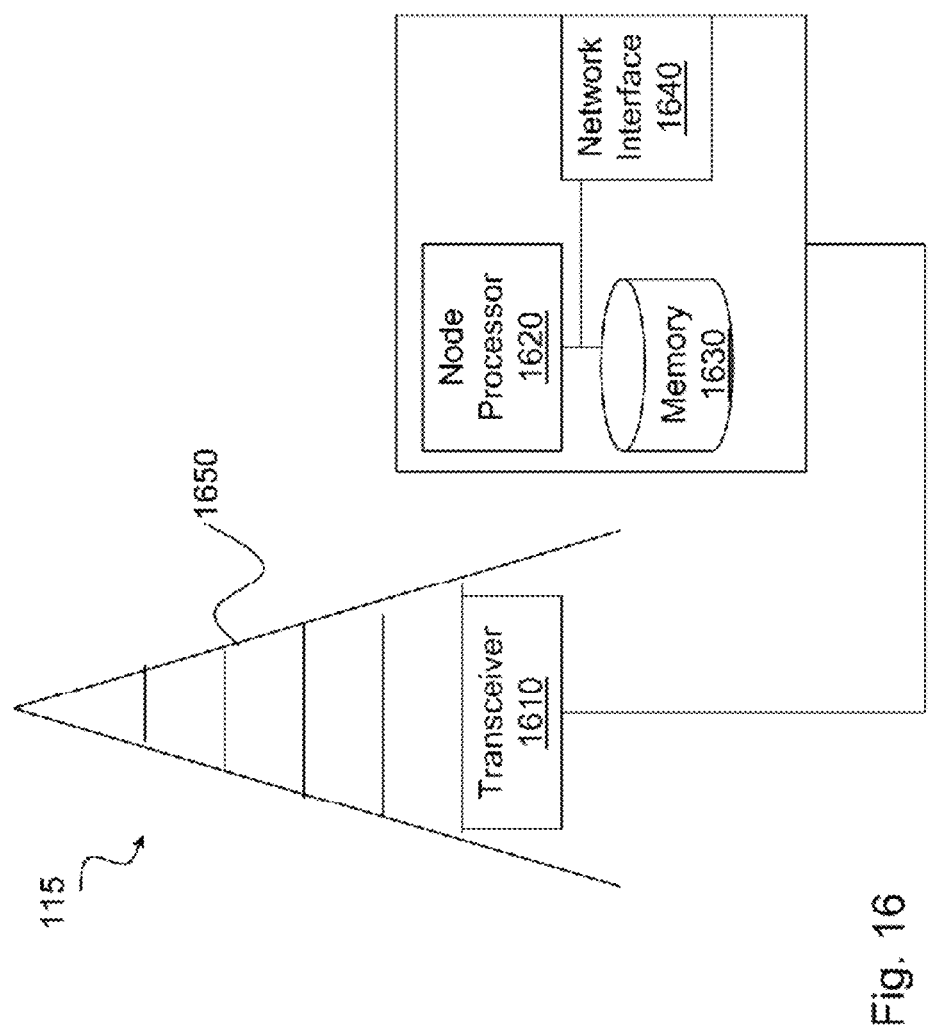
FIG. 16 is a block schematic of an exemplary network node, in accordance with certain embodiments.

FIG. 16 is at block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1610, processor 1620, memory 1630, and network interface 1640. In some embodiments, transceiver 1610 facilitates transmitting wireless signals to and receiving wireless signals from wireless device 110 (e.g., via antenna 1650), processor 1620 executes instructions to provide some or all of the functionality described above as being provided by a network node 115, memory 1630 stores the instructions executed by processor 1620, and network interface 1640 communicates signals to backend network components, such as a gateway, switch, router, Internet, Public Switched Telephone Network (PSTN), core network nodes or radio network controllers 130, etc.

Processor 1620 may include any suitable combination of hardware and software implemented in one or more modules to execute instructions and manipulate data to perform some or all of the described functions of network node 115, such as those described above in relation to FIGS. 1-14 above. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1640 is communicatively coupled to processor 1620 and may refer to any suitable device operable to receive input for network node 115, send output from network node 115, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of network node 115 may include additional components beyond those shown in FIG. 16 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

FIG. 17 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1720, memory 1730, and network interface 1740. In some embodiments, processor 1720 executes instructions to provide some or all of the functionality described above as being provided by the network node, memory 1730 stores the instructions executed by processor 1720, and network interface 1740 communicates signals to any suitable node, such as a gateway, switch, router, Internet, Public Switched Telephone Network (PSTN), network nodes 115, radio network controllers or core network nodes 130, etc.

Processor 1720 may include any suitable combination of hardware and software implemented in one or more modules to execute instructions and manipulate data to perform some or all of the described functions of the radio network controller or core network node 130. In some embodiments, processor 1720 may include, for example, one or more computers, one or more central processing units (CPUs), one or more microprocessors, one or more applications, and/or other logic.

Memory 1730 is generally operable to store instructions, such as a computer program, software, an application including one or more of logic, rules, algorithms, code, tables, etc. and/or other instructions capable of being executed by a processor. Examples of memory 1730 include computer memory (for example, Random Access Memory (RAM) or Read Only Memory (ROM)), mass storage media (for example, a hard disk), removable storage media (for example, a compact Disk (CD) or a Digital Video Disk (DVD)), and/or any other volatile or non-volatile, non-transitory computer-readable and/or computer-executable memory devices that store information.

In some embodiments, network interface 1740 is communicatively coupled to processor 1720 and may refer to any suitable device operable to receive input for the network node, send output from the network node, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of the network node may include additional components beyond those shown in FIG. 17 that may be responsible for providing certain aspects of the network node's functionality, including any of the functionality described above and/or any additional functionality (including any functionality necessary to support the solution described above).

FIG. 18 is a block schematic of an exemplary wireless device, in accordance with certain embodiments. Wireless device 110 may include one or more modules. For example, wireless device 110 may include a determining module 1810, a communication module 1320, a receiving module 1830, an input module 1840, a display module 1850, and any other suitable modules. Wireless device 110 may perform the methods to minimize network planning using mobility reference signal grouping described above with respect to FIGS. 1-14.

Determining module 1810 may perform the processing functions of wireless device 110. Determining module 1810 may include or be included in one or more processors, such as processor 1520 described above in relation to FIG. 15. Determining module 1810 may include analog and/or digital circuitry configured to perform any of the functions of determining module 1810 and or processor 1520 described above. The functions of determining module 1810 described above may, in certain embodiments, be performed in one or more distinct modules.

Communication module 1820 may perform the transmission functions of wireless device 110. Communication module 1820 may transmit messages to one or more of network nodes 115 of network 100. Communication module 1820 may include a transmitter and/or transceiver, such as transceiver 1510 described above in relation to FIG. 15. Communication module 1820 may include circuitry configured to wirelessly transmit messages and/or signals. In particular embodiments, communication module 1820 may receive messages and/or signals for transmission from determining module 1810. In certain embodiments, the functions of communication module 1820 described above may be performed in one or more distinct modules.

Receiving module 1830 may perform the receiving functions of wireless device 110. As one example, receiving module 1830 may receive information about the assigned node identifier for one or more of the plurality of nodes to a user equipment. As another example, receiving module 1830 may receive the selected mobility reference signals from the node. Receiving module 1830 may include a receiver and/or a transceiver, such as transceiver 1510 described above in relation to FIG. 15. Receiving module 1830 may include circuitry configured to wirelessly receive messages and/or signals. In particular embodiments, receiving module 1830 may communicate received messages and/or signals to determining module 1810.

Input module 1840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1810.

Display module 1850 may present signals on a display of wireless device 110. Display module 1850 may include the display and/or any appropriate circuitry and hardware configured to present signals on the display. Display module 1850 may receive signals to present on the display from determining module 1810.

Determining module 1810, communication module 1820, receiving module 1830, input module 1840, and display module 1850 may include any suitable configuration of hardware and/or software. Wireless device 110 may include additional modules beyond those shown in FIG. 18 that may be responsible for providing any suitable functionality, including any of the functionality described above and/or any additional functionality (including any functionality necessary to support the various solutions described herein).

FIG. 19 is a block schematic of an exemplary network node 115, in accordance with certain embodiments. Network node 115 may include one or more modules. For example, network node 115 may include determining module 1910, communication module 1920, receiving module 1930, and any other suitable modules. In some embodiments, one or more of determining module 1910, communication module 1920, receiving module 1930, or any other suitable module may be implemented using one or more processors, such as processor 1620 described above in relation to FIG. 16. In certain embodiments, the functions of two or more of the various modules may be combined into a single module. Network node 115 may perform the methods to minimize network planning using mobility reference signal grouping described above with respect to FIGS. 1-14.

Determining module 1910 may perform the processing functions of network node 115. According to one example embodiment, determining module 1910 may assign a node identifier to each of a plurality of nodes in the wireless communications network. Determining module 1910 may divide a pool of possible mobility reference signal sequences into a plurality of mobility reference signal groups. Determining module 1910 may assign each node of the plurality of nodes to one of the plurality of mobility reference signal groups. Determining module 1910 may configure each node to select one or more mobility reference signal sequences from its assigned mobility reference signal group.

According to another example embodiment, determining module 1910 may derive, based on a node identifier assigned to the node, one or more of: time, frequency, time/frequency resource elements, and mobility reference signal beam indexes that the node is allowed to use for mobility reference signal transmissions. Determining module 1910 may select, from a mobility reference signal group assigned to the node, a subset of mobility reference signal sequences included in the assigned mobility reference signal group. Determining module 1910 may reserve a subgroup of beam-reference IDs within its assigned mobility reference signal group. Determining module 1910 may determine that a mobility reference signal collision has occurred, and use this information to perform one or more operations related to ANR.

According to another example embodiment, determining module 1910 may select a reference signal sequence from the obtained group of reference signal sequences, and scramble a reference signal transmission pattern using the obtained node identifier and the selected reference signal sequence with associated beam reference identifier.

Determining module 1910 may include or be included in one or more processors, such as processor 1620 described above in relation to FIG. 16. Determining module 1910 may include analog and/or digital circuitry configured to perform any of the functions of determining module 1910 and/or processor 1620 described above. The functions of determining module 1910 may, in certain embodiments, be performed in one or more distinct modules. For example, in certain embodiments some of the functionality of determining module 1910 may be performed by an allocation module.

Communication module 1920 may perform the transmission functions of network node 115. As one example, communication module 1920 may transmit the selected mobility reference signals to one or more user equipment. As another example, communication module 1920 may communicate information about the assigned node identifier for one or more of the plurality of nodes to a user equipment. Communication module 1920 may transmit messages to one or more of wireless devices 110. Communication module 1920 may include a transmitter and/or a transceiver, such as transceiver 1610 described above in relation to FIG. 16. Communication module 1920 may include circuitry configured to wirelessly transmit messages and/or signals. In particular embodiments, communication module 1920 may receive messages and/or signals for transmission from determining module 1910 or any other module.

Receiving module 1930 may perform the receiving functions of network node 115. Receiving module 1930 may obtain a node identifier for the network node. The node identifier is unique for neighboring network nodes within a particular coverage area of the wireless communication network. Receiving module 1930 is operable to obtain a group of reference signal sequences. Receiving module 1930 may receive any suitable information from a wireless device. Receiving module 1930 may include a receiver and/or a transceiver, such as transceiver 1610 described above in relation to FIG. 16. Receiving module 1910 may include circuitry configured to wirelessly receive messages and/or signals. In particular embodiments, receiving module 1930 may communicate received messages and/or signals to determining module 1910 or any other suitable module.

Determining module 1910, communication module 1920, and receiving module 1930 may include any suitable configuration of hardware and/or software. Network node 115 may include additional modules beyond those shown in FIG. 19 that may be responsible for providing any suitable functionality, including any of the functionality described above and/or any additional functionality (including any functionality necessary to support the various solutions described herein).

The following examples summarize particular embodiments. According to one example embodiment, a method in a wireless communications network is disclosed. In some cases, the method can be performed by one or a plurality of network nodes (e.g., an eNodeB), or by another network entity which may also be responsible for some other tasks related to the operations and maintenance (O&M) function. The method comprises assigning a node identifier to each of a plurality of nodes in the wireless communications network. The method comprises dividing a pool of possible mobility reference signal sequences into a plurality of mobility reference signal groups, and assigning each node of the plurality of nodes to one of the plurality of mobility reference signal groups. The method comprises configuring each node to select one or more mobility reference signal sequences from its assigned mobility reference signal group. In certain embodiments, one or more of the following may apply: (a) the method may comprise allocating, to each node, time/frequency locations on which each node is allowed to transmit mobility reference signals; (b) the node identifier may comprise an access node ID, an eNB ID, a gNB, or a cell ID; (c) the pool of possible mobility reference signal sequences may be divided based on beam reference IDs of the possible mobility reference signal sequences; (d) the plurality of mobility reference signal groups may have different numbers of mobility reference signal sequences; (e) configuring each node to select one or more mobility reference signal sequences from its assigned mobility reference signal group may comprise configuring each node to select one or more mobility reference signal sequences from its assigned mobility reference signal group via an inter-node signaling interface; (f) the method may comprise configuring one of the plurality of nodes either in real-time based on instantaneous network requirements or in advanced based on a pre-specified rule to reserve a subgroup of beam-reference IDs within its assigned mobility reference signal group; (g)

the method may comprise lending the rights to use a subgroup of beam-reference IDs from one of the plurality of nodes to another one of the plurality of nodes via an inter-node signaling exchange; and (h) the method may comprise communicating information about the assigned node identifier for one or more of the plurality of nodes to a user equipment.

According to another example embodiment, a method in a network node is disclosed. The network node comprises one or more processors. The one or more processors are configured to assign a node identifier to each of a plurality of nodes in the wireless communications network. The one or more processors are configured to divide a pool of possible mobility reference signal sequences into a plurality of mobility reference signal groups, and assign each node of the plurality of nodes to one of the plurality of mobility reference signal groups. The one or more processors are configured to configure each node to select one or more mobility reference signal sequences from its assigned mobility reference signal group.

According to another example embodiment, a method in a node is disclosed. The method comprises deriving, based on a node identifier assigned to the node, one or more of: time, frequency, time/frequency resource elements, and mobility reference signal beam indexes that the node is allowed to use for mobility reference signal transmissions. The method comprises selecting, from a mobility reference signal group assigned to the node, a subset of mobility reference signal sequences included in the assigned mobility reference signal group. The method comprises transmitting the selected mobility reference signals to one or more user equipment. In certain embodiments, one or more of the following may apply: (a) the node identifier may comprise an access node ID, an eNB ID, a gNB, or a cell ID; (b) the method may comprise reserving a subgroup of beam-reference IDs within the mobility reference signal group assigned to the node; and (c) the method may comprise: determining that a mobility reference signal collision has occurred; and using this information to perform one or more operations related to ANR.

According to another example embodiment, a node is disclosed. The node comprises one or more processors. The one or more processors are configured to derive, based on a node identifier assigned to the node, one or more of: time, frequency, time/frequency resource elements, and mobility reference signal beam indexes that the node is allowed to use for mobility reference signal transmissions. The one or more processors are configured to select, from a mobility reference signal group assigned to the node, a subset of mobility reference signal sequences included in the assigned mobility reference signal group. The one or more processors are configured to transmit the selected mobility reference signals to one or more user equipment.

Certain embodiments of the present disclosure may provide one or more technical advantages. For example, certain embodiments may advantageously simplify network planning of a beam-based system substantially since it would avoid the planning of multiple MRSs per node. As another example, certain embodiments may advantageously allow the same planning tools, techniques and algorithms to be applied in NR. By doing that, the usage/allocation of MRSs by multiple nodes may not need any coordination since the collisions could be avoided by the fact that they would be transmitted in different time/frequency resources and even if so there might use different beam reference IDs. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ANR Automatic Neighbor Relation
AP Access Point
BS Base Station
BRS Beam Reference Signal
BSC Base Station Controller
BTS Base Transceiver Station
CDM Code Division Multiplexing
CP Cyclic Prefix
CPE Customer Premises Equipment
CRS Cell Specific Reference Signal
D2D Device-to-device
DAS Distributed Antenna System
DFT Discrete Fourier Transform
DL Downlink
ECGI E-UTRAN Cell Global Identifier
eNB evolved Node B
FDD Frequency Division Duplex
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MIMO Multiple Input Multiple Output
MR Measurement Restriction
MRS Mobility Reference Signal
MSR Multi-standard Radio
NAS Non-Access Stratum
NR Next Radio
O&M Operations and Maintenance
OFDM Orthogonal Frequency Division Multiplexing
PCI Physical Cell Identity
PDCCH Physical Downlink Control Channel
PDSCH Physical Downlink Shared Channel
PME Position Management Entity
PRB Physical Resource Block PSS Primary Synchronization Signal
PSTN Public Switched Telephone Network
PUSCH Physical Uplink Shared Channel
PUCCH Physical Uplink Control Channel
RB Resource Block
RI Rank Indicator
RNC Radio Network Controller
RRC Radio Resource Control
RRH Remote Radio Head
RRU Remote Radio Unit
RSRP Reference Signal Received Power
RSRQ Reference Signal Received Quality
SI System Information
SON Self-Organizing Network
SSS Secondary Synchronization Signal
TDD Time Division Duplex
TFRE Time Frequency Resource Element
TM Transmission Mode
TRP Transmission/Reception Point
TSS Time Synchronization Sequence
UE User Equipment
UL Uplink
WAN Wide Area Network

The invention claimed is:

1. A method for use in a network node of transmitting reference signals in a wireless communication network, the network node capable of transmitting a plurality of beams, the method comprising:
   obtaining a node identifier for the network node, the node identifier being unique for neighboring network nodes within a particular coverage area of the wireless communication network;
   obtaining a group of reference signal sequences, the group of reference signal sequences comprising a subset of a pool of possible reference signal sequences for use in the wireless communication network, each reference signal sequence associated with a beam reference identifier;
   selecting a reference signal sequence from the obtained group of reference signal sequences;
   scrambling a reference signal transmission pattern using the obtained node identifier and the selected reference signal sequence with associated beam reference identifier; and
   transmitting the scrambled reference signal transmission pattern to a user equipment on one of the beams among the plurality of beams.

2. The method of claim 1, further comprising determining, based on the obtained node identifier, time or frequency resources for transmission of the scrambled reference signal transmission pattern for each beam of the plurality of beams.

3. The method of claim 1, wherein the node identifier comprises one of an access node identifier, an eNodeB identifier, a gNodeB identifier, and a cell identifier.

4. The method of claim 1, wherein a maximum number of reference signal sequences in the group of reference signal sequences is greater than a maximum number of beams in the plurality of beams.

5. The method of claim 1, wherein the group of reference signal sequences comprises a group of reference signal sequences associated with odd numbered beam reference identifiers or a group of reference signal sequences associated with even numbered beam reference identifiers.

6. The method of claim 1, wherein the group of reference signal sequences comprises a group of reference signal sequences associated with a contiguous range of beam reference identifiers.

7. The method of claim 1, wherein the group of reference signal sequences comprises a group of reference signal sequences associated with a modulo n of the associated beam reference identifiers.

8. The method of claim 1, wherein the group of reference signal sequences comprises a group of reference signal sequences generated from a hash function performed on the associated beam reference identifiers.

9. The method of claim 1, further comprising communicating to another network node a subset of the group of reference signal sequences that the other network node may use for transmitting reference signals.

10. The method of claim 1, wherein the reference signal comprises a mobility reference signal (MRS).

11. The method of claim 1, wherein the reference signal comprises a channel state information reference signal (CSI-RS).

12. A network node capable of transmitting reference signals on a plurality of beams in a wireless communication network, the network node comprising a memory coupled to a processor, the processor operable to:
   obtain a node identifier for the network node, the node identifier being unique for neighboring network nodes within a particular coverage area of the wireless communication network;
   obtain a group of reference signal sequences, the group of reference signal sequences comprising a subset of a pool of possible reference signal sequences for use in the wireless communication network, each reference signal sequence associated with a beam reference identifier;
   select a reference signal sequence from the obtained group of reference signal sequences;
   scramble a reference signal transmission pattern using the obtained node identifier and the selected reference signal sequence with associated beam reference identifier; and
   transmit the scrambled reference signal transmission pattern to a user equipment on one of the beams among the plurality of beams.

13. The network node of claim 12, the processor further operable to determine, based on the obtained node identifier, time or frequency resources for transmission of the scrambled reference signal transmission pattern for each beam of the plurality of beams.

14. The network node of claim 12, wherein the node identifier comprises one of an access node identifier, an eNodeB identifier, a gNodeB identifier, and a cell identifier.

15. The network node of any of claim 12, wherein a maximum number of reference signal sequences in the group of reference signal sequences is greater than a maximum number of beams in the plurality of beams.

16. The network node of claim 12, wherein the group of reference signal sequences comprises a group of reference signal sequences associated with odd numbered beam reference identifiers or a group of reference signal sequences associated with even numbered beam reference identifiers.

17. The network node of claim 12, wherein the group of reference signal sequences comprises a group of reference signal sequences associated with a contiguous range of beam reference identifiers.

18. The network node of claim 12, wherein the group of reference signal sequences comprises a group of reference signal sequences associated with a modulo n of the associated beam reference identifiers.

19. The network node of claim 12, wherein the group of reference signal sequences comprises a group of reference signal sequences generated from a hash function performed on the associated beam reference identifiers.

20. The network node of claim 12, the processor further operable to communicate to another network node a subset of the group of reference signal sequences that the other network node may use for transmitting reference signals.

21. The network node of claim 12, wherein the reference signal comprises a mobility reference signal (MRS).

22. The network node of claim 12, wherein the reference signal comprises a channel state information reference signal (CSI-RS).

23. A network node capable of transmitting reference signals on a plurality of beams in a wireless communication network, the network node comprising a determining module, a communication module, and a receiving module;

the receiving module operable to:

obtain a node identifier for the network node, the node identifier being unique for neighboring network nodes within a particular coverage area of the wireless communication network;

obtain a group of reference signal sequences, the group of reference signal sequences comprising a subset of a pool of possible reference signal sequences for use in the wireless communication network, each reference signal sequence associated with a beam reference identifier;

the determining module operable to:

select a reference signal sequence from the obtained group of reference signal sequences;

scramble a reference signal transmission pattern using the obtained node identifier and the selected reference signal sequence with associated beam reference identifier; and the communication module operable to transmit the scrambled reference signal transmission pattern to a user equipment on one of the beams among the plurality of beams.

\* \* \* \* \*